United States Patent
Hwang et al.

(10) Patent No.: US 11,902,941 B2
(45) Date of Patent: Feb. 13, 2024

(54) METHOD AND DEVICE FOR ALLOCATING RESOURCE TO TERMINAL HAVING LIMITED RECEPTION OPERATION IN NR V2X

(71) Applicant: LG Electronics Inc., Seoul (KR)

(72) Inventors: Daesung Hwang, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/110,769

(22) Filed: Feb. 16, 2023

(65) Prior Publication Data

US 2023/0199722 A1 Jun. 22, 2023

Related U.S. Application Data

(63) Continuation of application No. PCT/KR2021/013619, filed on Oct. 5, 2021.

(30) Foreign Application Priority Data

Oct. 8, 2020 (KR) .......... 10-2020-0130495
Mar. 2, 2021 (KR) .......... 10-2021-0027607
Mar. 11, 2021 (KR) .......... 10-2021-0032182

(51) Int. Cl.
*H04W 72/40* (2023.01)
*H04W 72/02* (2009.01)
*H04W 28/26* (2009.01)
*H04W 72/0446* (2023.01)
(Continued)

(52) U.S. Cl.
CPC .......... *H04W 72/02* (2013.01); *H04L 1/0018* (2013.01); *H04W 28/26* (2013.01); *H04W 72/0446* (2013.01); *H04W 72/40* (2023.01); *H04W 72/512* (2023.01)

(58) Field of Classification Search
CPC ..... H04W 72/30; H04W 72/40; H04W 28/26; H04W 4/005; H04W 72/512; H04L 1/0018
See application file for complete search history.

(56) References Cited

U.S. PATENT DOCUMENTS

2022/0039065 A1* 2/2022 Yang ................. H04W 72/02
2022/0078758 A1* 3/2022 Lee .................. H04W 72/20
(Continued)

OTHER PUBLICATIONS

R1-1906796, "Sidelink Resource Allocation Mode-2 Design for NR V2X Communication", May 13-17, 2019, pp. 1-18 (Year: 2019).*
(Continued)

*Primary Examiner* — Salvador E Rivas
(74) *Attorney, Agent, or Firm* — Fish & Richardson P.C.

(57) ABSTRACT

A method by which a first device performs wireless communication is proposed. The method may comprise the steps of: determining at least one candidate slot for selecting a sidelink (SL) resource; performing sensing for at least one sensing slot related to the at least one candidate slot; selecting the resource in the at least one candidate slot on the basis of the sensing; and performing SL communication with a second device on the basis of the selected resource. For example, the at least one sensing slot may be at least one slot which, from the at least one candidate slot, is located before a resource reservation period set for a resource pool.

20 Claims, 21 Drawing Sheets

(51) Int. Cl.
  *H04L 1/00* (2006.01)
  *H04W 72/512* (2023.01)

(56) References Cited

U.S. PATENT DOCUMENTS

2022/0386284 A1* 12/2022 Zhao ............... H04W 72/541
2023/0142670 A1* 5/2023 Mohammad Soleymani .............
  H04W 72/02
  370/329

OTHER PUBLICATIONS

R1-2005537, "Resource Allocation Enhancements for Mode 2", Aug. 17-28, 2020, pp. 1-8 (Year: 2020).*
3GPP, "TR 37.985 V.16.0.0", Jul. 2020, pp. 1-37 (Year: 2020).*
CMCC, "Discussion on resource allocation for power saving," R1-2006230, Presented at 3GPP TSG RAN WG1 Meeting # 102-e, e-Meeting, Aug. 17-Aug. 28, 2020, 3 pages.
Huawei et al., "Sidelink resource allocation to reduce power consumption," R1-2006401, Presented at 3GPP TSG RAM WG1 Meeting # 102-e, e-meeting, Aug. 17-28, 2020, 5 pages.
International Search Report in International Appln. No. PCT/KR2021/013619, dated Dec. 29, 2021, 10 pages.
LG Electronics, "Discussion on resource allocation for power saving," R1-2005748, Presented at 3GPP TSG RAN WG1 Meeting # 102-e, e-Meeting, Aug. 17-Aug. 28, 2020, 5 pages.
NEC, "Views on resource allocation for power saving," R1-2005762, Presented at 3GPP TSG RAN WG1 #102-e, e-Meeting, Aug. 17-28, 2020, 5 pages.
Huawei, HiSilicon, "Remaining details of sidelink resource allocation mode 2," 3GPP TSG RAN WG1 Meeting #102-e, R1-2005798, E-meeting, Aug. 17-28, 2020, 18 pages.
NTT Docomo, INC.,"Discussion on sidelink resource allocation for power saving," 3GPP TSG RAN WG1 #102, R1-2006747, e-Meeting, Aug. 17-28, 2020, 6 pages.
Office Action in Korean Appln. No. 10-2023-7004975, dated Oct. 28, 2023, 12 pages (with English translation).

* cited by examiner

METHOD AND DEVICE FOR ALLOCATING RESOURCE TO TERMINAL HAVING LIMITED RECEPTION OPERATION IN NR V2X

CROSS-REFERENCE TO RELATED APPLICATIONS

Pursuant to 35 U.S.C. § 119(e), this application is a continuation of International Application PCT/KR2021/013619, with an international filing date of Oct. 5, 2021, which claims the benefit Korean Patent Application No. 10-2020-0130495, filed on Oct. 8, 2020, Korean Patent Application No. 10-2021-0027607, filed on Mar. 2, 2021, and Korean Patent Application No. 10-2021-0032182, filed on Mar. 11, 2021, the contents of which are hereby incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

Meanwhile, the UE may select sidelink (SL) resource(s) within a resource pool based on sensing. In the present disclosure, a scheme for the UE to select SL resource(s) may be referred to as a mode 2 scheme, a mode 2 operation, or a resource allocation mode 2. For example, in the resource allocation mode 2, the UE may detect sidelink control information (SCI) transmitted by other UEs, the UE may identify resource(s) reserved by other UEs based on the SCI, and the UE may obtain a reference signal received power (RSRP) measurement value. In addition, the UE may select resource(s) to be used for SL transmission except for the specific resource(s) within the resource selection window based on the above-described sensing result. In the case of the sensing operation, the UE may refer to resource allocation information received through a first SCI. However, due to the overhead of the first SCI, the amount of information that the UE can obtain on the first SCI may be limited.

Meanwhile, in the next generation system, the UE with limited SL reception may be introduced for the purpose of saving power, and the corresponding UE may also select resource(s) to be used for SL transmission in the resource allocation mode 2 scheme. However, if the SL reception is limited, the detection of SCI may also be limited, and accordingly, the efficiency of the resource allocation mode 2 may be deteriorate. The present disclosure proposes a method for the UE to efficiently perform sensing in a situation in which the SL reception operation is limited.

In an embodiment, provided is a method for performing wireless communication by a first device. The method may comprise: determining at least one candidate slot for selecting a sidelink (SL) resource; performing sensing for at least one sensing slot related to the at least one candidate slot; selecting a resource within the at least one candidate slot based on the sensing; and performing SL communication with a second device based on the selected resource. For example, the at least one sensing slot may be at least one slot located before a resource reservation period configured for a resource pool from the at least one candidate slot.

In an embodiment, provided is a first device adapted to perform wireless communication. The first device may comprise: one or more memories storing instructions; one or more transceivers; and one or more processors connected to the one or more memories and the one or more transceivers. For example, the one or more processors may execute the instructions to: determine at least one candidate slot for selecting a sidelink (SL) resource; perform sensing for at least one sensing slot related to the at least one candidate slot; select a resource within the at least one candidate slot based on the sensing; and perform SL communication with a second device based on the selected resource. For example, the at least one sensing slot may be at least one slot located before a resource reservation period configured for a resource pool from the at least one candidate slot.

The user equipment (UE) can efficiently perform SL communication.

DETAILED DESCRIPTION

Figure 1:
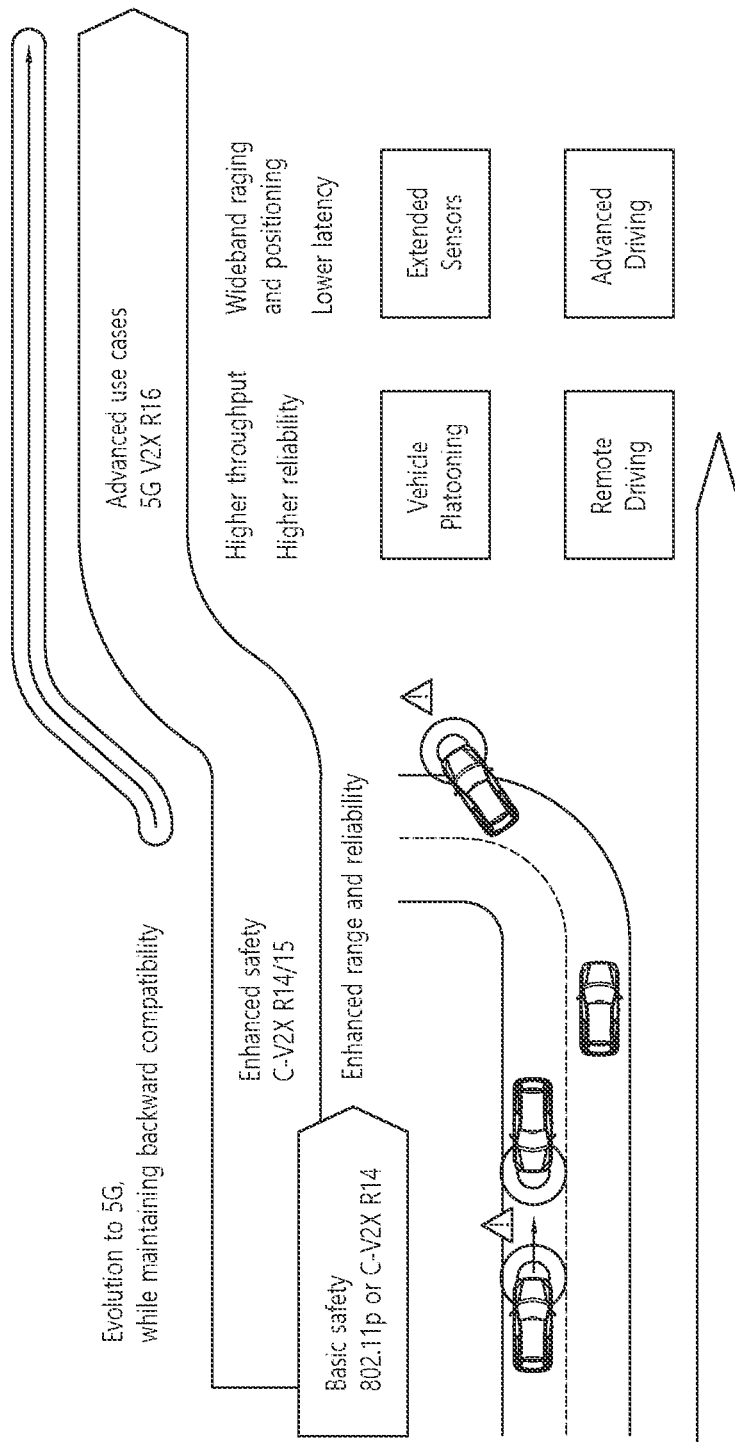
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A. B. and C". In addition, "at least one of A. B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
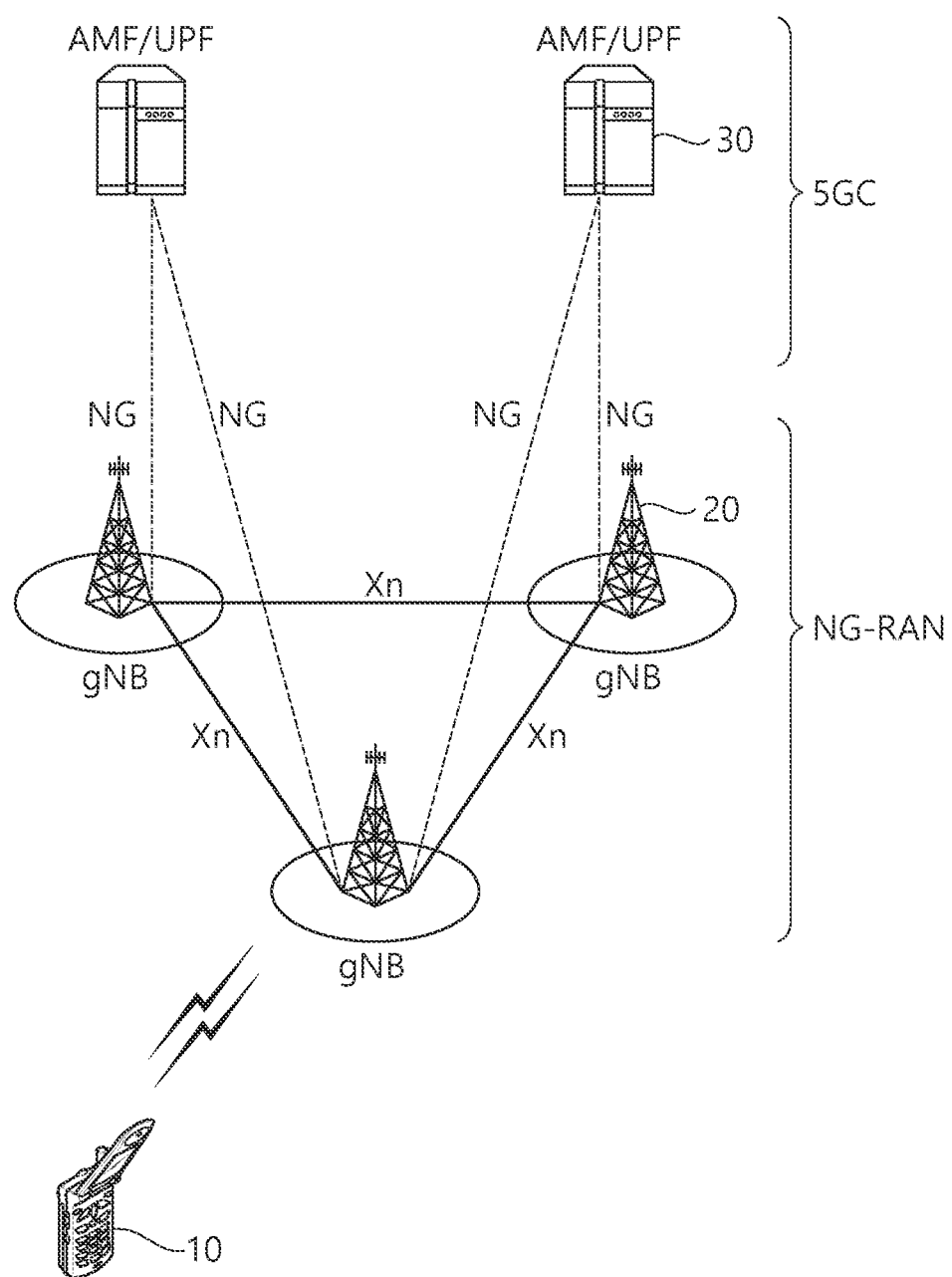
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
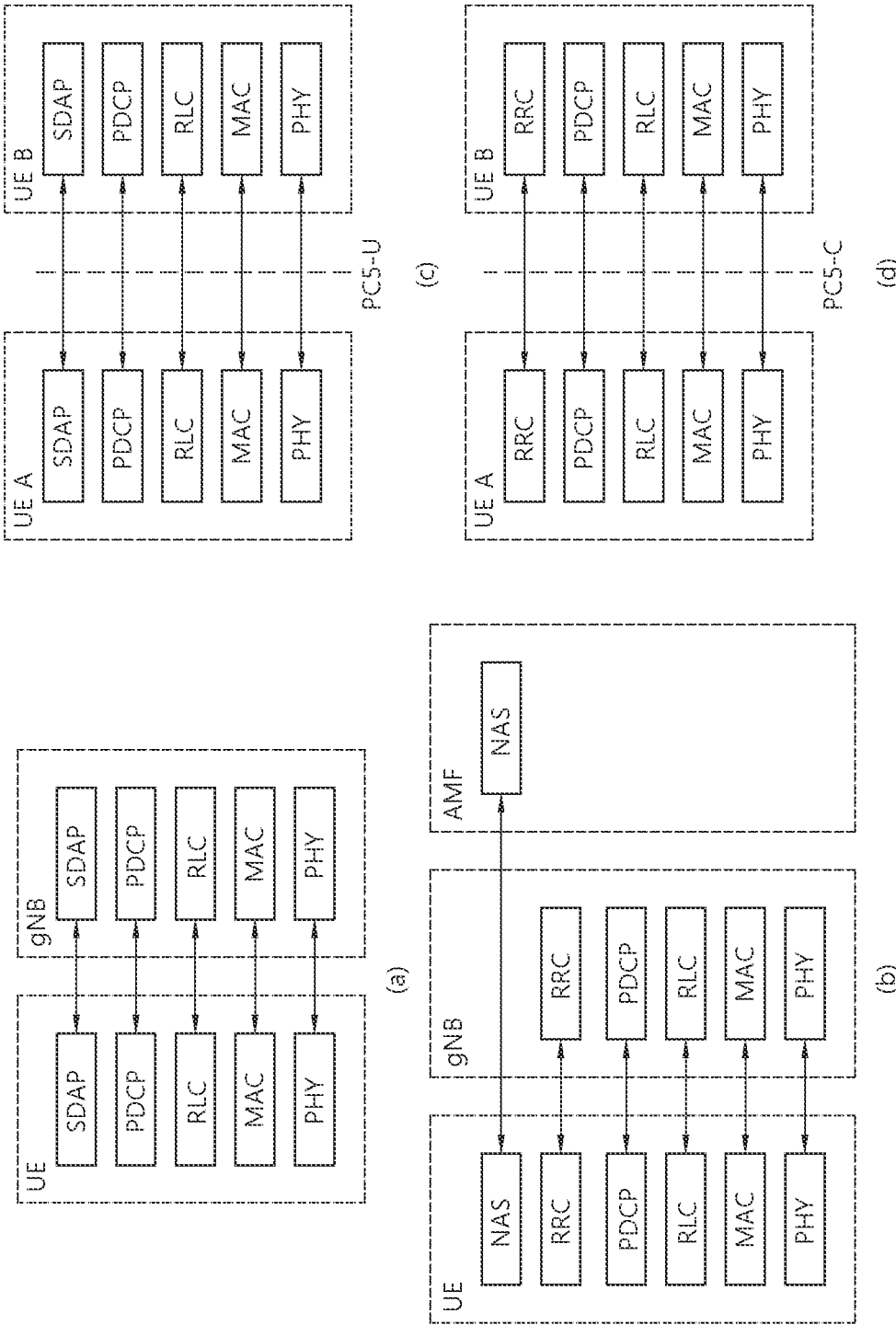
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
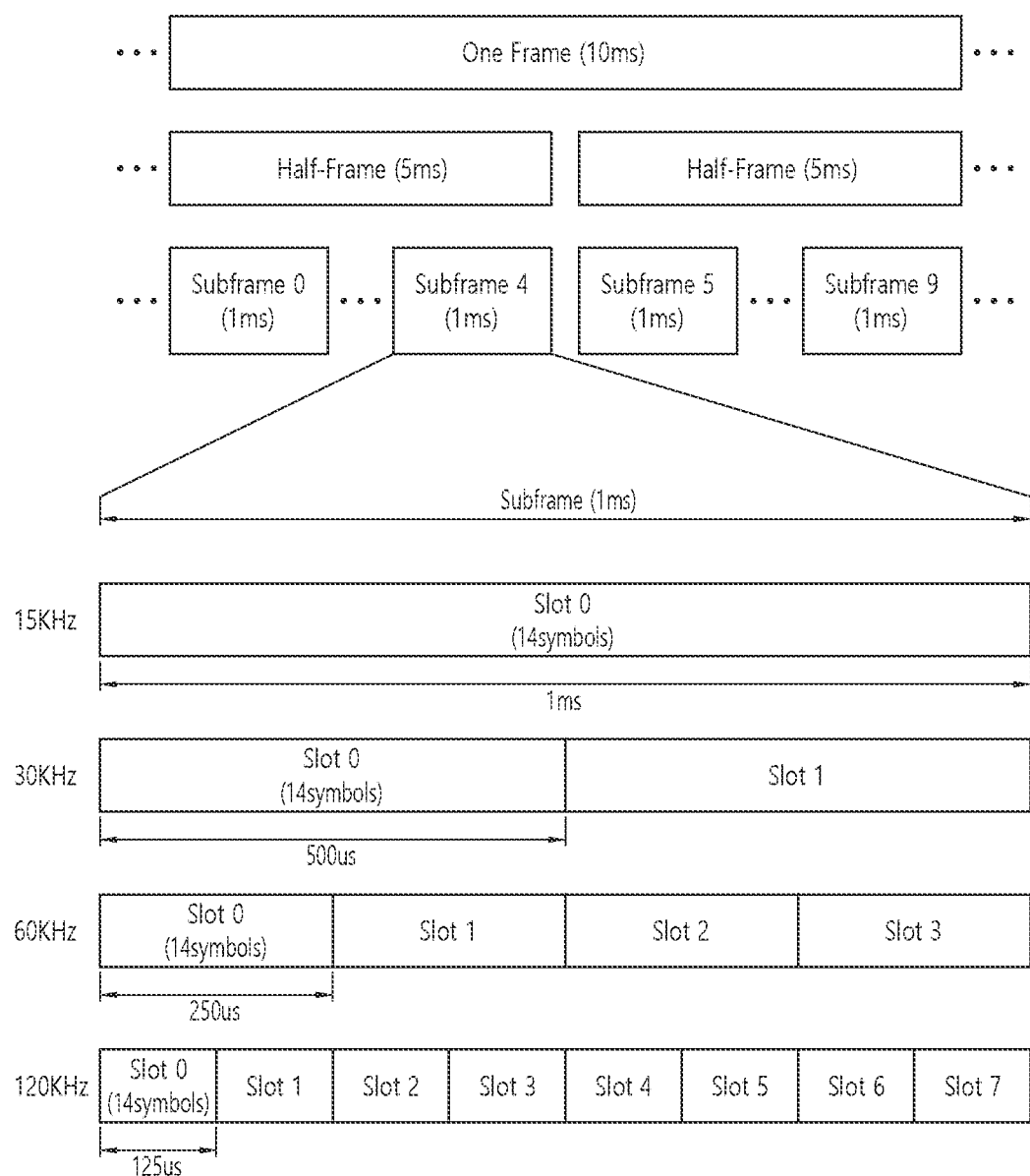
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2$^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2$^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
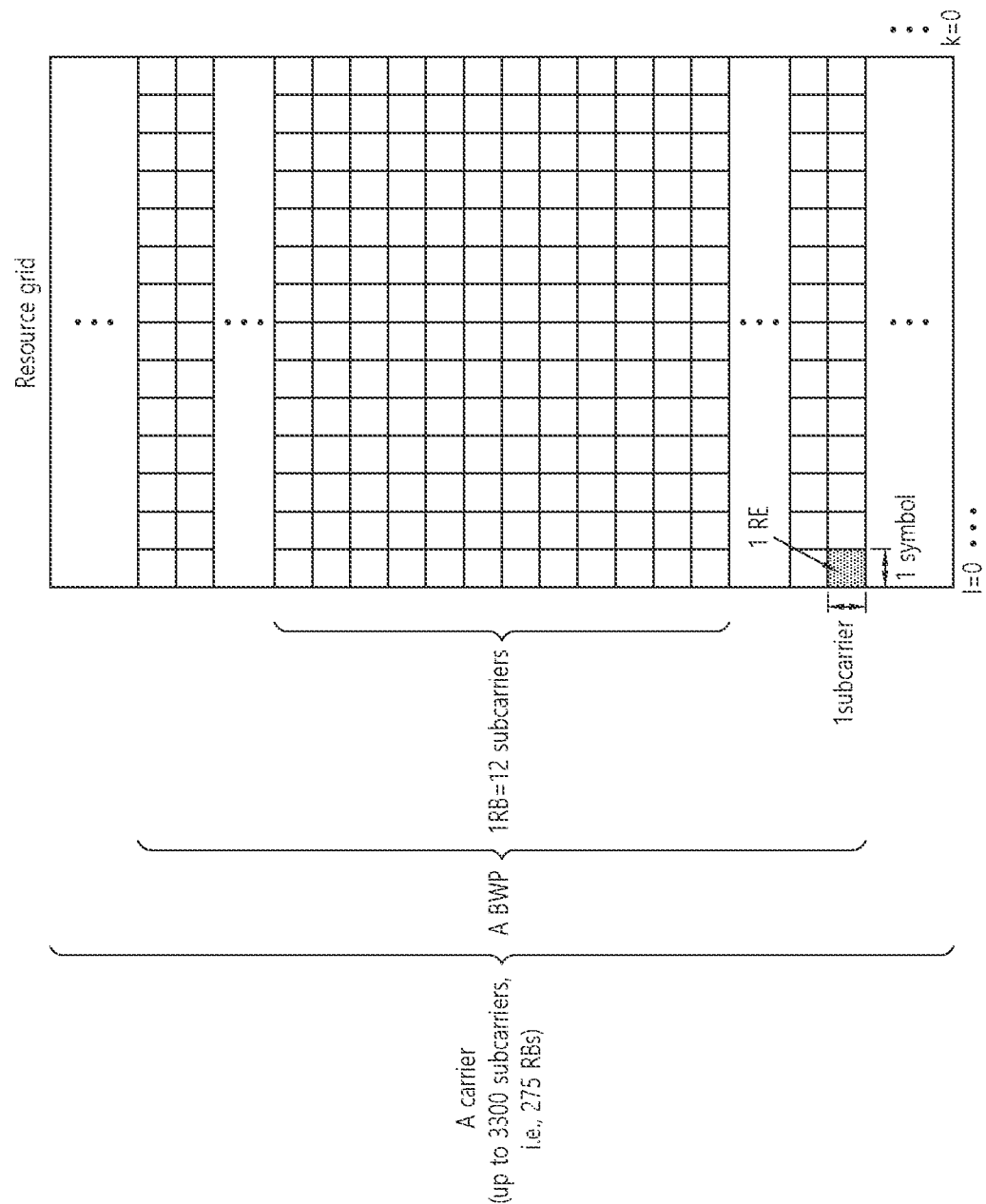
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
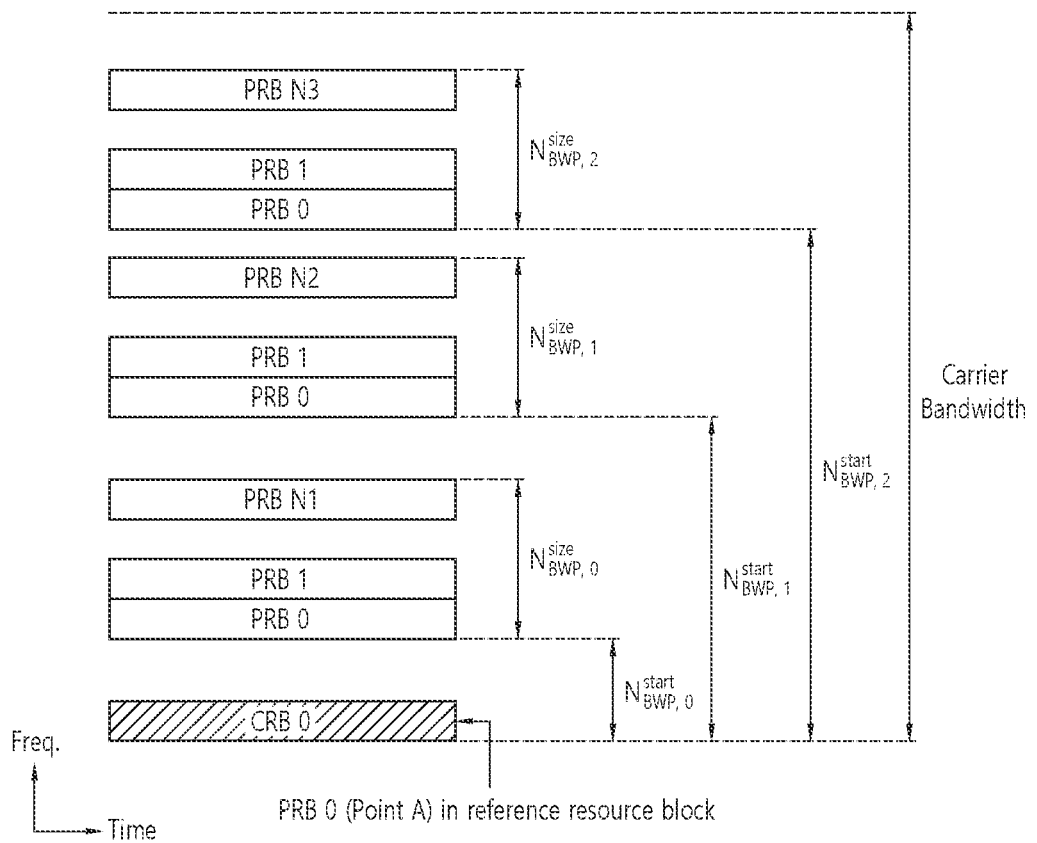
FIG. 6 shows an example of a BWP based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
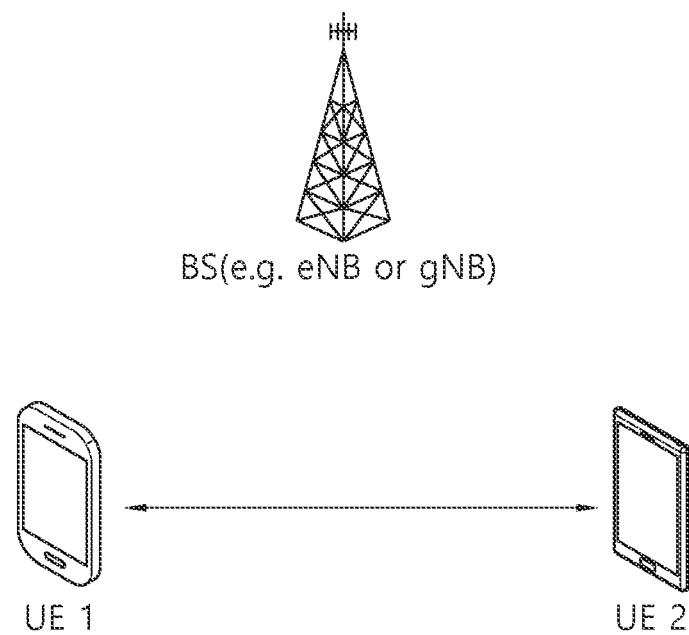
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
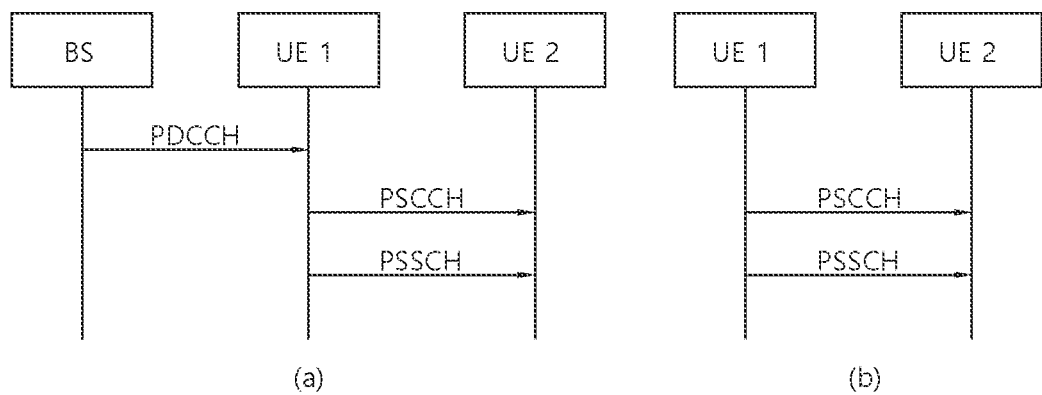
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

For example, in the NR resource allocation mode 1, the UE may be provided or allocated with one or more SL transmission resources of one transport block (TB) from the BS through a dynamic grant. For example, the BS may provide the UE with resource for PSCCH and/or PSSCH transmission based on the dynamic grant. For example, a transmitting UE may report to the BS an SL hybrid automatic repeat request (HARQ) feedback received from a receiving UE. In this case, based on an indication within a PDCCH used by the BS to allocate a resource for SL transmission, a PUCCH resource and timing for reporting an SL HARQ feedback to the BS may be determined.

For example, DCI may include information related to a slot offset between DCI reception and first/initial SL transmission scheduled by the DCI. For example, a minimum gap between the DCI for scheduling the SL transmission resource and a first scheduled SL transmission resource may be not less than a processing time of a corresponding UE.

For example, in the NR resource allocation mode 1, for multiple SL transmissions, the UE may be periodically provided or allocated with a resource set from the BS through a configured grant. For example, the configured grant may include a configured grant type 1 or a configured grant type 2. For example, the UE may determine a TB to be transmitted in each of occasions indicated by a given configured grant.

For example, the BS may allocate an SL resource to the UE on the same carrier, or may allocate the SL resource to the UE on a different carrier.

For example, an NR BS may control LTE-based SL communication. For example, the NR BS may transmit NR DCI to the UE to schedule an LTE SL resource. In this case, for example, a new RNTI may be defined to scramble the NR DCI. For example, the UE may include an NR SL module and an LTE SL module.

For example, after the UE including the NR SL module and the LTE SL module receives NR SL DCI from a gNB, the NR SL module may convert the NR SL DCI to an LTE DCI type 5A, and the NR SL module may transfer the LTE DCI type 5A to the LTE SL module in unit of X ms. For example, after the LTE SL module receives the LTE DCI format 5A from the NR SL module, the LTE SL module may apply activation and/or release in a first/initial LTE subframe after Z ms. For example, the X may be dynamically indicated by using a field of DCI. For example, a minimum value of the X may differ depending on UE capability. For example, the UE may report a single value depending on the UE capability. For example, the X may be a positive number.

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selection window by performing a sensing and resource (re)selection procedure. For example, the sensing may be performed in unit of subchannels. In addition, the UE 1 which has autonomously selected the resource within the resource pool may transmit the SC to the UE 2 through a PSCCH, and thereafter may transmit data based on the SCI to the UE 2 through a PSSCH.

For example, the UE may assist the SL resource selection for another UE. For example, in the NR resource allocation mode 2, the UE may be provided/allocated with a configured grant for SL transmission. For example, in the NR resource allocation mode 2, the UE may schedule SL transmission of another UE. For example, in the NR resource allocation mode 2, the UE may reserve an SL resource for blind retransmission.

For example, in the NR resource allocation mode 2, the UE 1 may use the SCI to indicate a priority of SL transmission to the UE 2. For example, the UE 2 may decode the SCI, and the UE 2 may perform sensing and/or resource (re)selection on the basis of the priority. For example, the resource (re)selection procedure may include a step in which the UE 2 identifies a candidate resource in a resource selection window and a step in which the UE 2 selects a resource for (re)transmission among the identified candidate resources. For example, the resource selection window may be a time interval for selecting a resource for SL transmission by the UE. For example, after the UE 2 triggers resource (re)selection, the resource selection window may start at T1≥0, and the resource selection window may be restricted by a remaining packet delay budget of the UE 2. For example, in the step in which the UE 2 identifies the candidate resource in the resource selection window, if a specific resource is indicated by the SCI received by the UE 2 from the UE 1 and if an L1 SL RSRP threshold for the specific resource exceeds an SL RSRP threshold, the UE 2 may not determine the specific resource as the candidate resource. For example, the SL RSRP threshold may be determined based on a priority of SL transmission indicated by the SCI received by the UE 2 from the UE 1 and a priority of SL transmission on a resource selected by the UE 2.

For example, the L1 SL RSRP may be measured based on an SL demodulation reference signal (DMRS). For example, one or more PSSCH DMRS patterns may be configured or pre-configured in a time domain for each resource pool. For example, a PDSCH DMRS configuration type 1 and/or type 2 may be identical or similar to a frequency domain pattern of the PSSCH DMRS. For example, a correct DMRS pattern may be indicated by the SCI. For example, in the NR resource allocation mode 2, the transmitting UE may select a specific DMRS pattern from among configured or pre-configured DMRS patterns for the resource pool.

For example, in the NR resource allocation mode 2, the transmitting UE may perform initial transmission of a transport block (TB) without reservation, based on the sensing and resource (re)selection procedure. For example, the transmitting UE may use an SCI related to a first/initial RB to reserve an SL resource for initial transmission of a second TB, based on the sensing and resource (re)selection procedure.

For example, in the NR resource allocation mode 2, the UE may reserve a resource for feedback-based PSSCH retransmission, through signaling related to previous transmission of the same TB. For example, the maximum number of SL resources reserved by one transmission including current transmission may be 2, 3, or 4. For example, the maximum number of SL resources may be identical irrespective of whether HARQ feedback is enabled. For example, the maximum number of HARQ (re)transmissions for one TB may be restricted by a configuration or a pre-configuration. For example, the maximum number of HARQ (re)transmissions may be up to 32. For example, in the absence of the configuration or the pre-configuration, the maximum number of HARQ (re)transmissions may not be designated. For example, the configuration or the pre-configuration may be for the transmitting UE. For example, in the NR resource allocation mode 2, HARQ feedback for releasing a resource not used by the UE may be supported.

For example, in the NR resource allocation mode 2, UE may use the SCI to indicate to another UE one or more sub-channels and/or slots used by the UE. For example, the UE may use the SCI to indicate to another UE one or more sub-channels and/or slots reserved by the UE for PSSCH (re)transmission. For example, a minimum allocation unit of an SL resource may be a slot. For example, a size of a sub-channel may be configured for the UE or may be pre-configured.

Figure 9:
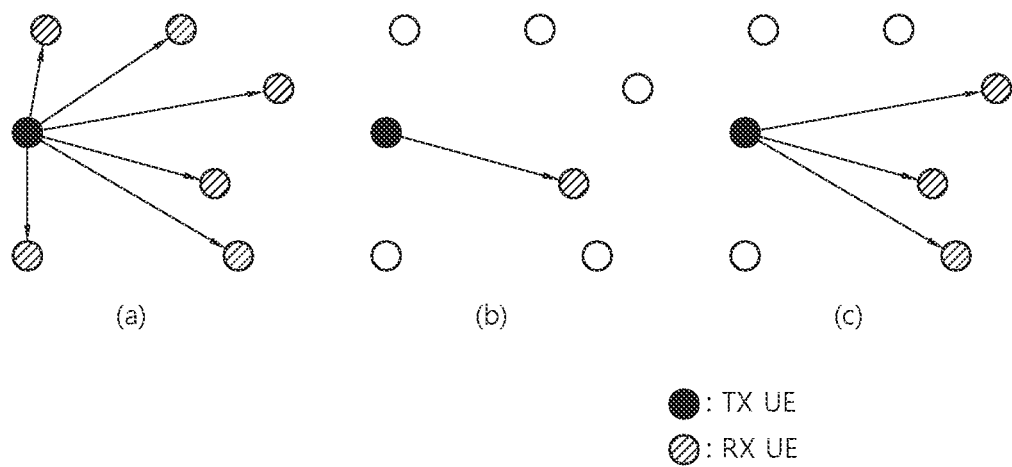
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in the present disclosure, for example, a transmitting UE (TX UE) may be a UE which transmits data to a (target) receiving UE (RX UE). For example, the TX UE may be a UE which performs PSCCH transmission and/or PSSCH transmission. Additionally/alternatively, for example, the TX UE may be a UE which transmits SL CSI-RS(s) and/or a SL CSI report request indicator to the (target) RX UE. Additionally/alternatively, for example, the TX UE may be a UE which transmits a (control) channel (e.g., PSCCH, PSSCH, etc.) and/or reference signal(s) on the (control) channel (e.g., DM-RS, CSI-RS, etc.), to be used for a SL radio link monitoring (RLM) operation and/or a SL radio link failure (RLF) operation of the (target) RX UE.

Meanwhile, in the present disclosure, for example, a receiving UE (RX UE) may be a UE which transmits SL HARQ feedback to a transmitting UE (TX UE) based on whether decoding of data received from the TX UE is successful and/or whether detection/decoding of a PSCCH (related to PSSCH scheduling) transmitted by the TX UE is successful. Additionally/alternatively, for example, the RX UE may be a UE which performs SL CSI transmission to the TX UE based on SL CSI-RS(s) and/or a SL CSI report request indicator received from the TX UE. Additionally/alternatively, for example, the RX UE is a UE which transmits a SL (L1) reference signal received power (RSRP) measurement value, to the TX UE, measured based on (pre-defined) reference signal(s) and/or a SL (L1) RSRP report request indicator received from the TX UE. Additionally/alternatively, for example, the RX UE may be a UE which transmits data of the RX UE to the TX UE. Additionally/alternatively, for example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, for example, in case the RX UE transmits SL HARQ feedback information for a PSSCH and/or a PSCCH received from the TX UE, the following options or some of the following options may be considered. Herein, for example, the following options or some of the following options may be limitedly applied only if the RX UE successfully decodes/detects a PSCCH scheduling a PSSCH.

(1) groupcast option 1: no acknowledgement (NACK) information may be transmitted to the TX UE only if the RX UE fails to decode/receive the PSSCH received from the TX UE.

(2) groupcast option 2: If the RX UE succeeds in decoding/receiving the PSSCH received from the TX UE, ACK information may be transmitted to the TX UE, and if the RX UE fails to decode/receive the PSSCH, NACK information may be transmitted to the TX UE.

Meanwhile, in the present disclosure, for example, the TX UE may transmit the following information or some of the following information to the RX UE through SCI(s). Herein, for example, the TX UE may transmit some or all of the following information to the RX UE through a first SCI and/or a second SCI.

- PSSCH (and/or PSCCH) related resource allocation information (e.g., the location/number of time/frequency resources, resource reservation information (e.g., period))
- SL CSI report request indicator or SL (L1) reference signal received power (RSRP) (and/or SL (L1) reference signal received quality (RSRQ) and/or SL (L1) reference signal strength indicator (RSSI)) report request indicator
- SL CSI transmission indicator (or SL (L1) RSRP (and/or SL (L1) RSRQ and/or SL (L1) RSSI) information transmission indicator) (on a PSSCH)
- Modulation and Coding Scheme (MCS) information
- TX power information
- L1 destination ID information and/or L1 source ID information
- SL HARQ process ID information
- New Data Indicator (NDI) information
- Redundancy Version (RV) information
- (Transmission traffic/packet related) QoS information (e.g., priority information)
- SL CSI-RS transmission indicator or information on the number of antenna ports for (transmitting) SL CSI-RS
- TX UE location information or location (or distance range) information of the target RX UE (for which SL HARQ feedback is requested)
- Reference signal (e.g., DM-RS, etc.) information related to decoding (and/or channel estimation) of data transmitted through a PSSCH. For example, information related to a pattern of (time-frequency) mapping resources of DM-RS(s). RANK information, antenna port index information, information on the number of antenna ports, etc.

Meanwhile, in the present disclosure, for example, since the TX UE may transmit a SCI, a first SCI and/or a second SCI to the RX UE through a PSCCH, the PSCCH may be replaced/substituted with the SCI and/or the first SCI and/or the second SCI. Additionally/alternatively, the SCI may be replaced/substituted with the PSCCH and/or the first SCI and/or the second SCI. Additionally/alternatively, for example, since the TX UE may transmit a second SCI to the RX UE through a PSSCH, the PSSCH may be replaced/substituted with the second SCI.

Meanwhile, in the present disclosure, for example, if SCI configuration fields are divided into two groups in consideration of a (relatively) high SCI payload size, the first SCI including a first SC configuration field group may be referred to as a $1^{st}$ SCI, and the second SCI including a second SCI configuration field group may be referred to as a $2^{nd}$ SCI. Also, for example, the $1^{st}$ SCI may be transmitted to the receiving UE through a PSCCH. Also, for example, the $2^{nd}$ SCI may be transmitted to the receiving UE through a (independent) PSCCH or may be piggybacked and transmitted together with data through a PSSCH.

Meanwhile, in the present disclosure, the term "configuration/configured or definition/defined" may be interpreted as being (pre-)configured from the base station or the network (through predefined signaling (e.g., SIB, MAC signaling, RRC signaling)). For example, "A may be configured" may include "that the base station or the network (pre-)configures/defines or informs A to the UE". Alternatively, the term "configuration/configured or definition/defined" may be interpreted as being pre-configured or pre-defined in the system. For example, "A may be configured" may include "that A is pre-configured/defined in the system".

Meanwhile, in the present disclosure, for example, since an RLF may be determined based on out-of-synch (OOS) indicator(s) or in-synch (IS) indicator(s), the RLF may be replaced/substituted with out-of-synch (OOS) indicator(s) or in-synch (IS) indicator(s).

Meanwhile, in the present disclosure, for example, an RB may be replaced/substituted with a subcarrier. Also, in the present disclosure, for example, a packet or a traffic may be replaced/substituted with a TB or a MAC PDU based on a transmission layer.

Meanwhile, in the present disclosure, a CBG may be replaced/substituted with a TB.

Meanwhile, in the present disclosure, for example, a source ID may be replaced/substituted with a destination ID.

Meanwhile, in the present disclosure, for example, an L1 ID may be replaced/substituted with an L2 ID. For example, the L1 ID may be an L1 source ID or an L1 destination ID. For example, the L2 ID may be an L2 source ID or an L2 destination ID.

Meanwhile, in the present disclosure, for example, an operation of the transmitting UE to reserve/select/determine retransmission resource(s) may include: an operation of the transmitting UE to reserve/select/determine potential retransmission resource(s) for which actual use will be determined based on SL HARQ feedback information received from the receiving UE.

Meanwhile, in the present disclosure, a sub-selection window may be replaced/substituted with a selection window and/or the pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel. In addition, for example, cast may be replaced/substituted with at least one of unicast, groupcast, and/or broadcast, or vice versa. For example, a cast type may be replaced/substituted with at least one of unicast, groupcast, and/or broadcast, or vice versa.

Meanwhile, in the present disclosure, a resource may be replaced/substituted with a slot or a symbol, or vice versa. For example, the resource may include a slot and/or a symbol.

Meanwhile, in the present disclosure, a priority may be replaced/substituted with at least one of logical channel prioritization (LCP), latency, reliability, minimum required communication range, prose per-packet priority (PPPP), sidelink radio bearer (SLRB), QoS profile, QoS parameter and/or requirement, or vice versa.

Meanwhile, in various embodiments of the present disclosure, the reservation resource and/or the selection resource may be replaced/substituted with a sidelink grant (SL GRANT).

Meanwhile, in various embodiments of the present disclosure, latency may be replaced/substituted with a packet delay budget (PDB).

Meanwhile, in various embodiments of the present disclosure, a message for triggering a report on sidelink channel state information/sidelink channel quality information (hereinafter, SL_CSI information) may be replaced/substituted with a sidelink channel state information reference signal (CSI-RS) reception.

Meanwhile, in the present disclosure, blind retransmission may refer that the TX UE performs retransmission without receiving SL HARQ feedback information from the RX UE. For example, SL HARQ feedback-based retransmission may refer that the TX UE determines whether to perform retransmission based on SL HARQ feedback information received from the RX UE. For example, if the TX UE receives NACK and/or DTX information from the RX UE, the TX UE may perform retransmission to the RX UE.

Meanwhile, in the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in the present disclosure, a Uu channel may include a UL channel and/or a DL channel. For example, the UL channel may include a PUSCH, a PUCCH, a sounding reference Signal (SRS), etc. For example, the DL channel may include a PDCCH, a PDSCH, a PSS/SSS, etc. For example, a SL channel may include a PSCCH, a PSSCH, a PSFCH, a PSBCH, a PSSS/SSSS, etc.

Meanwhile, in the present disclosure, sidelink information may include at least one of a sidelink message, a sidelink packet, a sidelink service, sidelink data, sidelink control information, and/or a sidelink transport block (TB). For example, sidelink information may be transmitted through a PSSCH and/or a PSCCH.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

Figure 10:
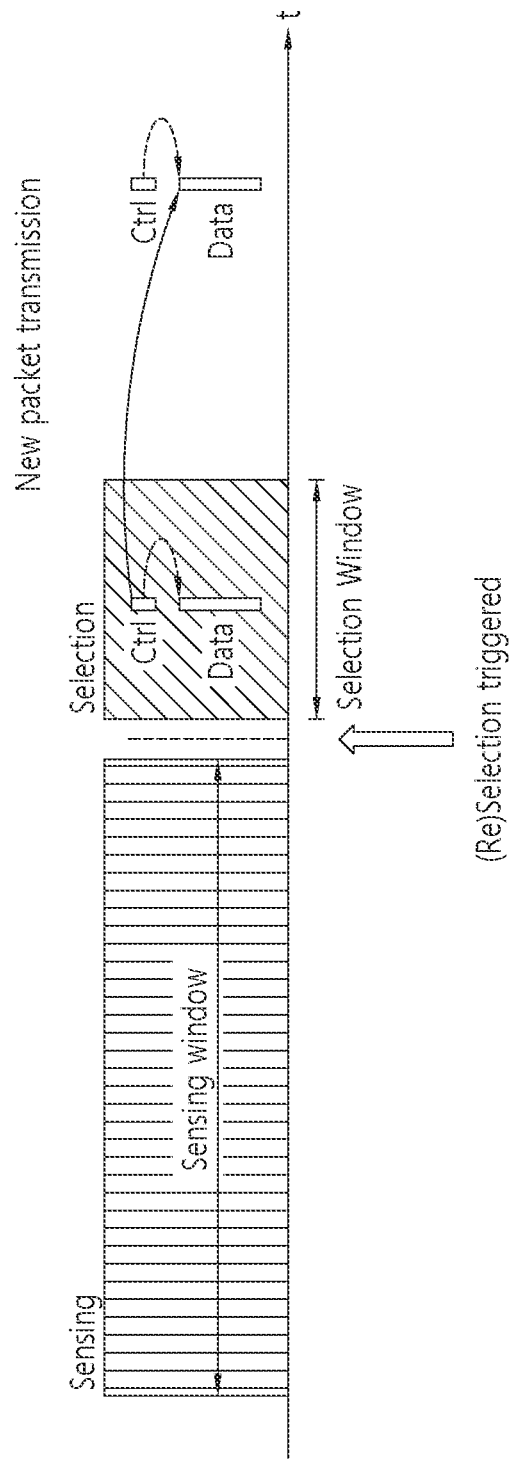
FIG. 10 shows an example in which transmission resource(s) is selected, based on an embodiment of the present disclosure.

FIG. 10 shows an example in which transmission resource(s) is selected, based on an embodiment of the present disclosure. The embodiment of FIG. 10 may be combined with various embodiments of the present disclosure.

In relation to the selection of transmission resource(s), in V2X communication, 2 transmissions per MAC PDU may be performed. For example, referring to FIG. 10, when selecting a resource for initial transmission, resource(s) for retransmission may be reserved with a predetermined time gap. The UE may determine transmission resource(s) reserved by other UEs or resource(s) used by other UEs through sensing within a sensing window, and after such transmission resource(s) is excluded from a selection window, the UE may randomly select resource(s) from among the remaining resources with little interference.

For example, within the sensing window, the UE may decode a PSCCH including information on a period of the reserved resources and may measure PSCCH RSRP from the periodically determined resources based on the PSCCH. The UE may exclude resources having the PSSCH RSRP that exceeds a threshold value from the selection window. Thereafter, the UE may randomly select sidelink resources from the remaining resources within the selection window.

Alternatively, the UE may measure received signal strength indication (RSSI) of the periodic resources within the sensing window, so as to determine resources having little interference (e.g., resources corresponding to the lower 20%). And, among the periodic resources, the UE may randomly select sidelink resources from the resources included in the selection window. For example, in case the UE fails to perform decoding of the PSCCH, the UE may use the above-described method.

Meanwhile, the UE may select sidelink (SL) resource(s) within a resource pool based on sensing. In the present disclosure, a scheme for the UE to select SL resource(s) may be referred to as a mode 2 scheme, a mode 2 operation, or a resource allocation mode 2. For example, in the resource allocation mode 2, the UE may detect SCI transmitted by other UEs, the UE may identify resource(s) reserved by other UEs based on the SCI, and the UE may obtain an RSRP measurement value. In addition, the UE may select resource(s) to be used for SL transmission except for the specific resource(s) within the resource selection window based on the above-described sensing result. In the case of the sensing operation, the UE may refer to resource allocation information received through a first SCI. However, due to the overhead of the first SCI, the amount of information that the UE can obtain on the first SCI may be limited. Meanwhile, in the next generation system, the UE with limited SL reception may be introduced for the purpose of saving power, and the corresponding UE may also select resource(s) to be used for SL transmission in the resource allocation mode 2 scheme. However, if the SL reception is limited, the detection of SC may also be limited, and accordingly, the efficiency of the resource allocation mode 2 may be deteriorate. The present disclosure proposes a method for the UE to efficiently perform sensing in a situation in which the SL reception operation is limited.

Meanwhile, in the resource allocation mode 2, in order for the UE to select resource(s) for SL transmission within a resource selection window, the UE may attempt to detect SCI within a sensing window, and the UE may use reservation information in the detected SCI and an RSRP measurement value corresponding thereto. That is, for example, based on the SCI detected within the sensing window, the UE may determine whether resources located at the time after a resource reservation period indicated by the SCI from the time at which the SCI is detected and reservation resources indicated by the SCI are available resources. That is, for example, if the resource reservation period value is small, the size of the sensing window needs to be reduced accordingly.

Meanwhile, the size of the sensing window may be configured to either 1000 msec or 1000 slots. For example, the size of the sensing window may be pre-configured to either 1000 msec or 1000 slots. For example, the size of the sensing window that can be configured for the UE (hereinafter, P-UE) having at least a limited SL reception capability may be extended. In this case, for example, the size of the sensing window that can be configured for the P-UE may include all or part of candidate resource reservation period values. For example, the UE may expect that the size of the sensing window is not greater than the maximum resource reservation period value (pre-)configured in the corresponding resource pool. For example, the P-UE may not perform SCI detection for some N slots ahead in time within the sensing window. For example, the value of N may be a value derived from the maximum value of the resource reservation periods configured in the corresponding resource pool. For example, the P-UE may not perform SCI detection for sensing, in slots earlier than a slot before the maximum resource reservation period from the first slot of potential selection slots or the resource selection window. For example, the potential selection slots may be slots selected by the P-UE as the target of available resources of the P-UE.

Meanwhile, the P-UE may select slot(s) that can potentially be available resource(s) within the resource selection window. Thereafter, for example, the P-UE may configure available resources within the potential available slot(s) based on the detected SCI information and the RSRP measurement value corresponding thereto. For example, the number of potential available slots selected by the P-UE may be greater than or equal to a (pre-)configured threshold. For example, the P-UE may receive additional information from another UE, and the additional information may indicate the potential available slot(s) for the P-UE. That is, for example, the P-UE may receive additional information including information on the potential available slot(s) from another UE. For example, the P-UE may receive additional information from another UE, and the additional information may indicate slot(s) that cannot be used as the potential available slot(s) for the P-UE. That is, for example, the P-UE may receive additional information including information on slot(s) that cannot be used as the potential available slot(s) from another UE. For example, the P-UE may receive additional information from another UE, and the additional information may include information on preferred or non-preferred resource(s). In this case, for example, the P-UE may preferentially select a slot capable of securing many available resources as the potential available slot. For example, the potential available slot may be a slot including the predetermined number or more of subchannels or subchannel group candidates corresponding to the preferred resource(s). For example, the potential available slot may be a slot including the predetermined number or less of subchannels or subchannel group candidates corresponding to the non-preferred resource(s). For example, the P-UE may select the potential available slot(s) such that the total number of sensing slots is minimized. For example, the P-UE may select the potential available slot(s) such that sensing slots corresponding to the potential available slot(s) overlap each other as much as possible. For example, an interval between potential available slots may be 100 msec, a conversion value of the number of logical slots for 100 msec, or a multiple value for 100 msec. For example, the P-UE may select the potential available slot(s) such that an interval between sensing slots is equal to or greater than a predetermined level (e.g., 6 msec or 20 msec). This is because, if the distance between the sensing slots is greater than or equal to a predetermined level, the P-UE can save power through the high-level SLEEP MODE. For example, an interval between potential available slots may be greater than or equal to a specific threshold. For example, the specific threshold may be a value (pre-)configured for the UE. For example, the specific threshold may be 6 msec or 20 msec. For example, the specific threshold may be a value obtained by converting 6 msec or 20 msec into the number of logical slots. For example, the value converted into the number of logical slots may be a value obtained by dividing the number of SL slots available within a specific period (e.g., 20 msec or 10240 msec) by 20 or 10240. For example, the SL available slot may be a slot in which a symbol period including as many symbols as the number of SL symbols from the SL start symbol is configured as a cell-specific UL resource. For example, the SL available slot may be a slot other than a S-SSB slot. For example, the SL available slot may be a slot in a resource pool.

Meanwhile, the P-UE may determine slot(s) to perform sensing from the potential available slot(s) selected by the P-UE. For example, the P-UE may perform sensing in slot(s) before a specific time based on each of the potential available slot(s). For example, the specific time may be resource reservation period value(s) configured in the corresponding resource pool. In this case, for example, the P-UE may determine slots to perform sensing for each potential available slot by using each of resource reservation period values. For example, the resource reservation period values may be greater than or equal to a specific threshold value (e.g., 100 msec, 20 msec, or a (pre-)configured value). For example, if a slot before a specific time from the selected potential available slot does not belong to the sensing window, it may not be required or expected for the UE to perform sensing in the slot. For example, the UE performing the partial sensing-based resource selection may receive a (pre-)configured 16-bit bitmap. For example, each bit of the bitmap may be related with 16 configured resource reservation period values, and if each bit of the bitmap is a value of 1 or 0, the UE may perform the partial sensing based on the corresponding resource reservation period values.

Meanwhile, resource reservation period value(s) may be less than 100 msec, and in this case, power consumption may be excessive if the number of sensing slots of the P-UE is increased in consideration of the corresponding value(s). For example, if a resource reservation period value is less than a specific threshold value (e.g., 100 msec, 20 msec, or a (pre-)configured value), whether the P-UE configures sensing slots may be (pre-)configured for each resource pool, for each transmission priority of the P-UE, for each service type, for each QoS parameter, and/or for each congestion control level range. For example, the P-UE may determine sensing slots for all or a part of previous slots with a period of a first step unit (e.g., 100 msec, 100 msec converted to logical slot unit, a (pre-)configured value, or the configured value converted to logical slot unit) for each potential available slot. In this case, for example, whether to configure a slot of which period as a sensing slot may be (pre-)configured to the P-UE in the form of a bitmap. For example, if the potential available slot is n, the P-UE may perform sensing in n−k*P1 slots. For example, k may indicate in which period the sensing is performed (i.e., the order of the period in which the sensing is performed) in the form of the bitmap. For example, P1 may indicate the period. For example, the slot may represent an index for logical slots belonging to a resource pool. For example, the P-UE may determine sensing slots for all or a part of previous slots with a period of a second step unit (e.g., 1 msec, 1 msec converted to logical slot unit, a (pre-)configured value, or the configured value converted to logical slot unit) for each potential available slot. In this case, for example, whether to configure a slot of which period as a sensing slot may be (pre-)configured to the P-UE in the form of a bitmap. For example, if the potential available slot is n, the P-UE may perform sensing in n−k*P2 slots. For example, k may indicate in which period the sensing is performed (i.e., the order of the period in which the sensing is performed) in the form of the bitmap. For example, P2 may indicate the period. According to various embodiments of the present disclosure, the method of deriving slot(s) to perform sensing from the potential available slot(s) based on the step size of two steps may be a method of deriving a single sensing slot or a plurality of sensing slots to be derived based on the period values for each of all or part of resource reservation period values configured in the resource pool, such as three or four steps. For example, the P-UE may derive sensing slot(s) based on the period values, for each of all or part of resource reservation period values configured in the resource pool. For example, the slot(s) may represent an index for logical slots belonging to the resource pool. In this case, for example, the slot(s) for performing the sensing may be basically included in the sensing window of the P-UE. For example, when the UE derives slot(s) to perform sensing from the potential available slot(s) based on a specific resource reservation period, the number of slots to be sensed derived from the reservation period may be determined based on the resource selection window size, the distance between the end time of the resource selection window and the time at which the resource selection is triggered (represented by T_2), the resource reservation period value (or a value obtained by converting the resource reservation period into the number of logical slots) and/or the time at which the resource selection is triggered. For example, when the P-UE derives slot(s) to perform sensing from the potential available slot(s) based on a specific resource reservation period configured in the resource pool, the number of slots to be sensed derived from the reservation period may be determined based on at least one of the resource selection window size, the distance between the end time of the resource selection window and the time at which the resource selection is triggered (represented by T_2), the resource reservation period value, the value obtained by converting the resource reservation period into the number of logical slots, or the time at which the resource selection is triggered. For example, T_scal may be a value obtained by converting the value of T_2 into the unit of msec. For example, if the slot n in which resource selection is triggered belongs to a resource pool, n' may be an index conversion value of a logical slot for n. For example, if slot n in which resource selection is triggered does not belong to a resource pool, n' may be an index conversion value of a logical slot for a slot belonging to the earliest resource pool after slot n. For example, in a specific situation, the number of sensing slots related with the potential available slot(s) for the specific resource reservation period may be a value obtained by dividing a T_scal value by the resource reservation period value or a rounded-up value of the divided value. For example, in this case, the specific situation may be a case where the resource reservation period value is smaller than T_scal and/or a case where sensing slot(s) derived from the specific resource reservation period value from the potential available slot(s) does not belong to the sensing window. For example, the number of sensing slots related with the potential available slot(s) for the specific resource reservation period may be derived based on slots of the previous period until sensing slot(s) derived by the specific resource reservation period value from the potential available slot(s) belongs to the sensing window. That is, for example, the number of sensing slots related with the potential available slot(s) for the specific resource reservation period may include slots of the previous period until the sensing slot(s) derived by the specific resource reservation period value from the potential available slot(s) is included in the sensing window. For example, the number of sensing slots related with the potential available slot(s) for each resource reservation period may be pre-configured.

Meanwhile, in various embodiments of the present disclosure, the number of sensing slots derived from the potential available slot(s) based on the specific resource reservation period may be plural. In this case, if the number of the derived sensing slots is plural, reception patterns derived from SCI received when the UE selects resource(s) may be different. For example, resource selection may include resource reselection. For example, if the UE receives SCI, the UE may generate a reception pattern to be assumed when selecting resource(s) from information in the SCI, and the UE may exclude a transmission pattern overlapping the reception pattern from available resources according to a specific condition. For example, the reception pattern may be expressed as a combination of a subchannel and a slot. For example, the transmission pattern may be expressed as a combination of at least one of a subchannel, a slot, a transmission resource reservation period, or a resource reselection counter. For example, the specific condition may be that a PSCCH DMRS-based RSRP measurement value or a PSSCH DMRS-based RSRP measurement value corresponding to the SCI is greater than or equal to a configured threshold. For example, the configured threshold may be a pre-configured value. For example, the location of the reserved resource(s) generated from the received SCI information may be derived based on at least one of a resource reservation value indicated by the SCI, the number of sensing slots configured for the resource reservation value, or information on the location of the sensing slot. For example, if the UE receives SCI in the logical slot index m, and if the logical slot conversion value for the resource reservation period value indicated by the SCI is P, the UE may assume/determine that the location of the reserved resource derived from the SCI is located at m+k'*P. For example, the value of k' may inherit the parameter k value used to derive the location of the sensing slot. That is, for example, the value of k' may be determined based on the value of k. For example, if the value of k is 3, the UE may similarly assume/determine that the reserved resource occurs in m+3*P. Or, for example, the value of k' may be in a range (e.g., 1, 2, . . . , k) in which the parameter k used to derive the location of the sensing slot has a maximum value. For example, if the value of k is 3, the UE may assume/determine that the reserved resource occurs in m+P, m+2*P, and m+3*P.

Meanwhile, in the case of the P-UE, it is necessary to perform resource selection in consideration of aperiodic traffic. In this case, since the P-UE needs to perform SCI detection before performing actual transmission, a method for alleviating excessive SCI detection attempts may be required. For example, the P-UE may attempt to detect SCI from before a specific time from each potential available resource. For example, the specific time may be 32 or 31 slots. This is because resources that can be indicated at one time in SCI are limited within a 32-slot window. For example, the specific time may be a value (pre-)configured to the UE for at least one of a resource pool, a transmission priority, a transmission resource reservation period, a congestion control level range, a service type, or a QoS parameter. For example, the specific time may be determined based on a logical slot domain belonging to a resource pool from the potential available resource(s). For example, the specific time may be a previous time by the number of logical slots N belonging to the resource pool with respect to the value of N. For example, the P-UE may perform SCI detection for all or part of slots within a contiguous sensing period for each potential available slot. For example, the slot(s) to perform sensing within the contiguous sensing period may be a value (pre-)configured to the UE for at least one of a resource pool, a transmission priority, a transmission resource reservation period, a congestion control level range, a service type, or a QoS parameter.

For example, in consideration of aperiodic traffic, the P-UE may perform SCI detection for a part of slots before each potential available slot, and the P-UE may select available resource(s) based on the detected SCI. In consideration of periodic traffic, the P-UE may select available resource(s) from the received additional information.

For example, if the ratio of the number of available resources selected based on RSRP corresponding to the detected SCI to the number of candidate resources for the number of potential available slots is less than a (pre-)configured threshold, the P-UE may select available resource(s) again after increasing an RSRP threshold. For example, if the ratio of the number of available resources selected based on RSRP corresponding to the detected SCI to the number of candidate transmission patterns is less than a (pre-)configured threshold, the P-UE may select available resource(s) again after increasing an RSRP threshold.

Additionally, for example, if the set of P values is not (pre-)configured, the set of P values may correspond to all values of a (pre-)configured list of sidelink resource reservation periods (e.g., sl-ReosourceReservePeriodList parameter) in periodic-based partial sensing. For example, basically, the set of P values may correspond to all values of a (pre-)configured list of sidelink resource reservation periods (e.g., sl-ReosourceReservePeriodList parameter) in periodic-based partial sensing.

For example, a single set of P values may be (pre-)configured. Herein, the single set of P values may be limited to a subset of the (pre-)configured list of sidelink resource reservation periods (e.g., sl-ReosourceReservePeriodList parameter).

For example, P values may be configured for each (pre-)configuration of a mode 2 transmission resource pool.

For example, the UE may monitor a list of other sidelink resource reservation periods that are not part of the limited subset.

For example, in periodic-based partial sensing for resource (re)selection, the UE may monitor in periodic sensing occasion(s) for a given reservation periodicity before the first slot of the selected Y candidate slots subject to processing time restriction for the identification of candidate resources.

For example, for the k value in periodic-based partial sensing for resource (re)selection, by default, the UE may monitor the most recent sensing occasion for a given reservation periodicity before the resource (re)selection trigger slot n or the first slot of the set of Y candidate slots subject to processing time restriction.

For example, the k value in periodic-based partial sensing for resource (re)selection is (pre-)configured, the UE may additionally monitor periodic sensing occasions that correspond to a set of values which can be (pre-)configured with at least one value.

Figure 11:
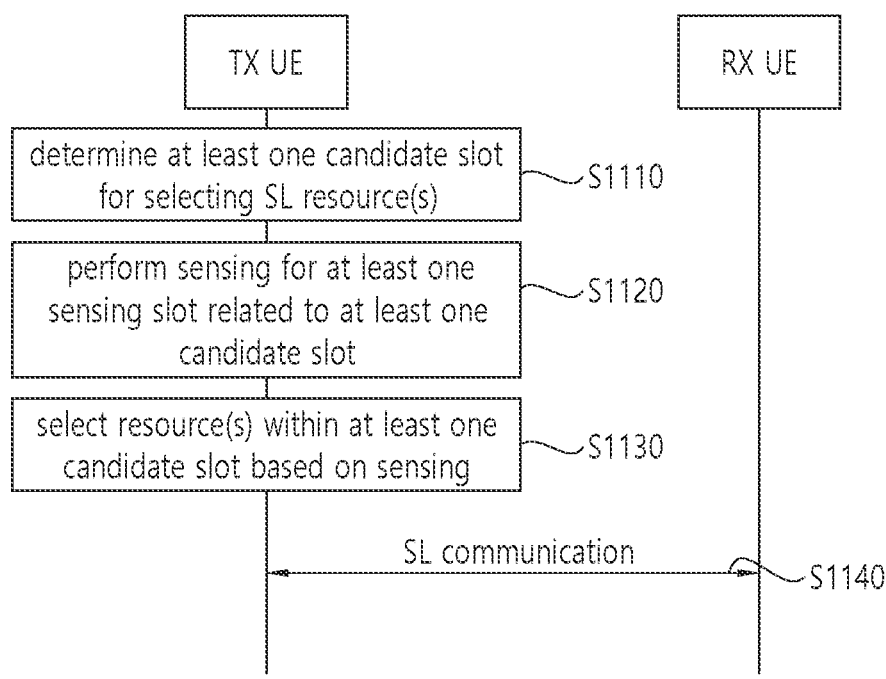
FIG. 11 shows a procedure for a transmitting UE to perform SL communication with a receiving UE based on selected resource(s), based on an embodiment of the present disclosure.

FIG. 11 shows a procedure for a transmitting UE to perform SL communication with a receiving UE based on selected resource(s), based on an embodiment of the present disclosure. The embodiment of FIG. 11 may be combined with various embodiments of the present disclosure.

Referring to FIG. 11, in step S1110, the transmitting UE may determine at least one candidate slot for selecting sidelink (SL) resource(s). In step S1120, the transmitting UE may perform sensing for at least one sensing slot related to at least one candidate slot. In step S1130, the transmitting UE may select resource(s) within at least one candidate slot based on sensing. In step S1140, the transmitting UE may perform SL communication with the receiving UE based on the selected resource(s).

For example, the at least one sensing slot may be at least one slot located before resource reservation period(s) configured for a resource pool from the at least one candidate slot.

For example, the at least one sensing slot may be at least one slot located before the maximum resource reservation period configured for the resource pool from the first slot among the at least one candidate slot.

For example, each of the at least one sensing slot may be determined based on at least one of the at least one candidate slot, resource reservation period(s) configured for the resource pool, or a value for deriving the location of the sensing slot. For example, the value for deriving the location of the sensing slot may be a value indicating in which period the sensing slot is located (i.e., the order of the period in which the sensing slot is located). For example, the value for deriving the location of the sensing slot may be configured in the form of a bitmap. For example, the resource reservation period value(s) may be greater than or equal to a threshold. For example, the threshold may be a pre-configured value.

For example, the at least one sensing slot may be determined for each of the at least one candidate slot.

For example, based on the number of resource reservation periods configured for the resource pool, the at least one sensing slot for the at least one candidate slot may be determined for each of the plurality of resource reservation periods.

For example, the number of the at least one candidate slot may be greater than or equal to a threshold. For example, the number of the at least one candidate slot may be equal to or greater than a pre-configured threshold.

For example, the number of the at least one sensing slot may be determined based on at least one of the size of a window for selecting resource(s), the resource reservation period value(s), the time at which resource selection is triggered, and/or the interval between the time at which the resource selection is triggered and the end time of the window.

For example, the transmitting UE may receive additional information from the receiving UE. For example, the at least one candidate slot may be determined based on the additional information. For example, the additional information may include information on preferred resource(s) or non-preferred resource(s).

For example, the interval between the at least one sensing slot may be greater than or equal to a threshold. For example, the interval between the at least one sensing slot may be greater than or equal to a pre-configured threshold.

Figure 12:
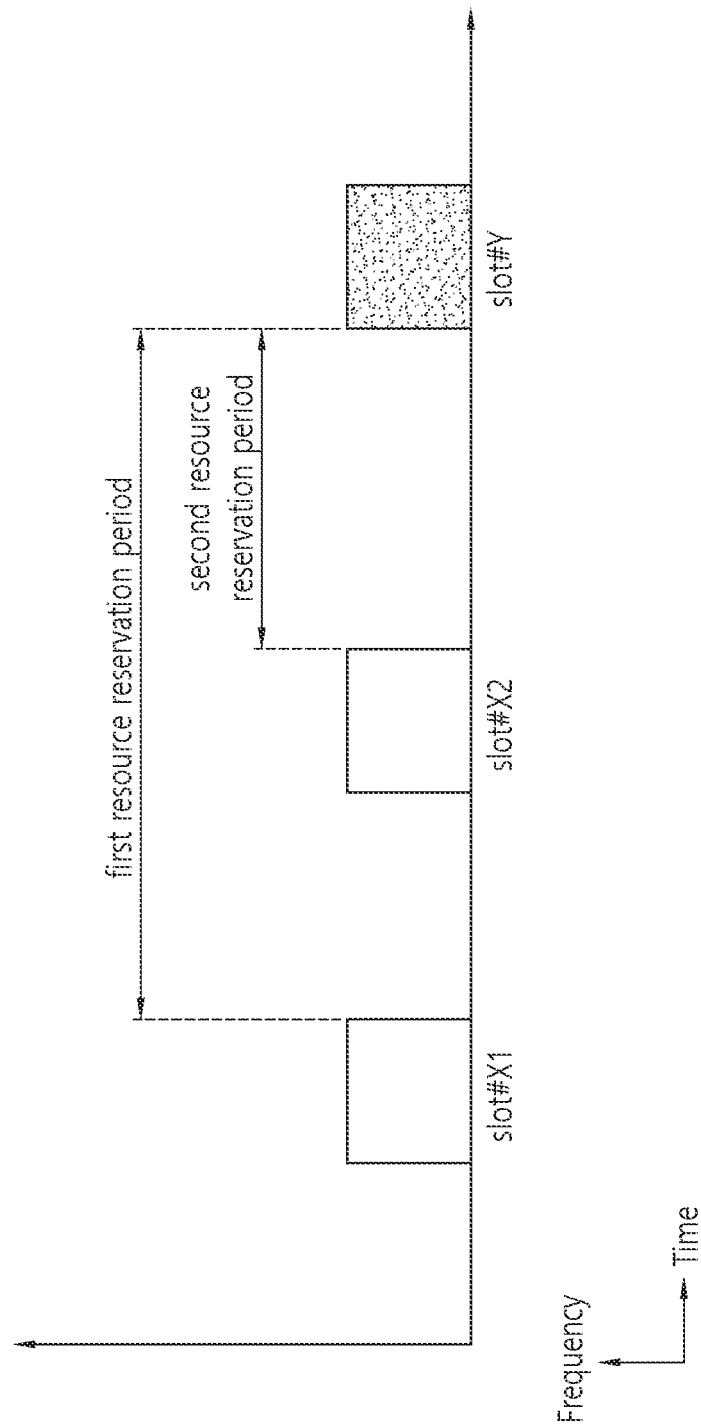
FIG. 12 shows an example of at least one sensing slot related to at least one candidate slot, based on an embodiment of the present disclosure.

FIG. 12 shows an example of at least one sensing slot related to at least one candidate slot, based on an embodiment of the present disclosure. The embodiment of FIG. 12 may be combined with various embodiments of the present disclosure.

Referring to FIG. 12, the slot #Y may be a candidate slot for selecting SL resource(s). For example, the slot #Y may be the first slot among a set of candidate slots. The slot #X1 and the slot #X2 may be sensing slots related to the candidate slot (slot #Y).

For example, the slot #X1 may be a slot located before a first resource reservation period configured for a resource pool from the slot #Y. For example, the first resource reservation period may be the maximum resource reservation period configured for the resource pool. For example, the slot #X2 may be a slot located before a second resource reservation period configured for the resource pool from the slot #Y.

For example, based on a plurality of resource reservation periods configured for the resource pool, sensing slots for the candidate slot (slot #Y) may be determined for each of the plurality of resource reservation periods.

For example, the number of sensing slots may be determined based on at least one of the size of a window for selecting resource(s), resource reservation period value(s), the time at which resource selection is triggered, and/or an interval between the time at which the resource selection is triggered and the end time of the window.

Figure 13:
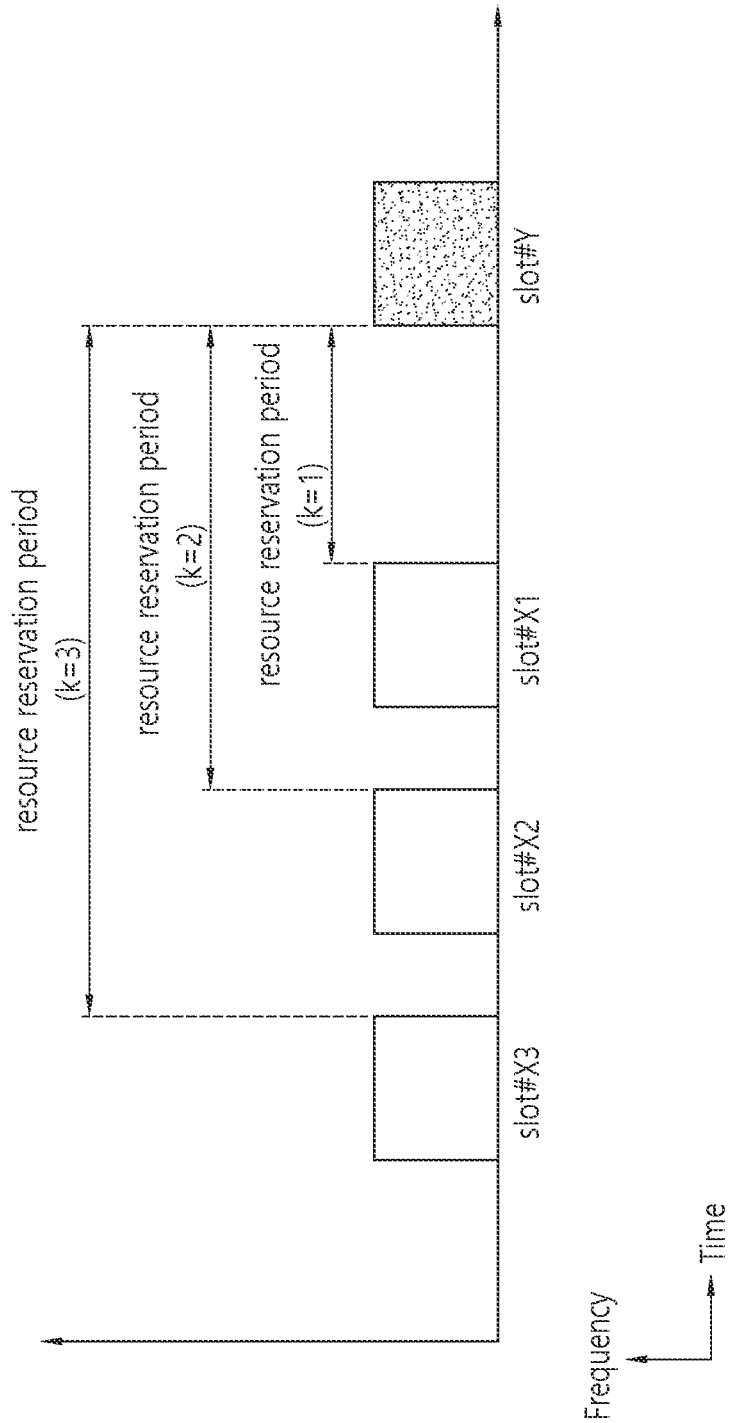
FIG. 13 shows another example of at least one sensing slot related to at least one candidate slot, based on an embodiment of the present disclosure.

FIG. 13 shows another example of at least one sensing slot related to at least one candidate slot, based on an embodiment of the present disclosure. The embodiment of FIG. 13 may be combined with various embodiments of the present disclosure.

Referring to FIG. 13, the slot #Y may be a candidate slot for selecting SL resource(s). For example, the slot #Y may be the first slot among a set of candidate slots. The slot #X1, the slot #X2, and the slot #X3 may be sensing slots related to the candidate slot (slot #Y).

For example, each sensing slot may be determined based on the candidate slot, resource reservation period(s) configured for a resource pool, and a value for deriving the location of the sensing slot.

For example, the value for deriving the location of the sensing slot may be a value indicating in which period the sensing slot is located (i.e., the order of the period in which the sensing slot is located). For example, the value for deriving the location of the sensing slot may be a value of k. For example, if the candidate slot is the slot #Y and the value of k is 1, the sensing slot may be the slot #X1 located before the resource reservation period configured for the resource pool from slot #Y. That is, for example, the slot #X1 may be located in the slot #(Y−1*resource reservation period). For example, if the candidate slot is the slot #Y and the value k is 2, the sensing slot may be the slot #X2 located before the resource reservation period configured for the resource pool from the slot #Y. That is, for example, the slot #X2 may be located in the slot #(Y−2*resource reservation period). For example, if the candidate slot is the slot #Y and the value k is 3, the sensing slot may be the slot #X3 located before the resource reservation period configured for the resource pool from slot #Y. That is, for example, the slot #X3 may be located in the slot #(Y−3*resource reservation period).

For example, the interval between sensing slots may be greater than or equal to a threshold. For example, the interval between sensing slots may be greater than or equal to a pre-configured threshold.

Figure 14:
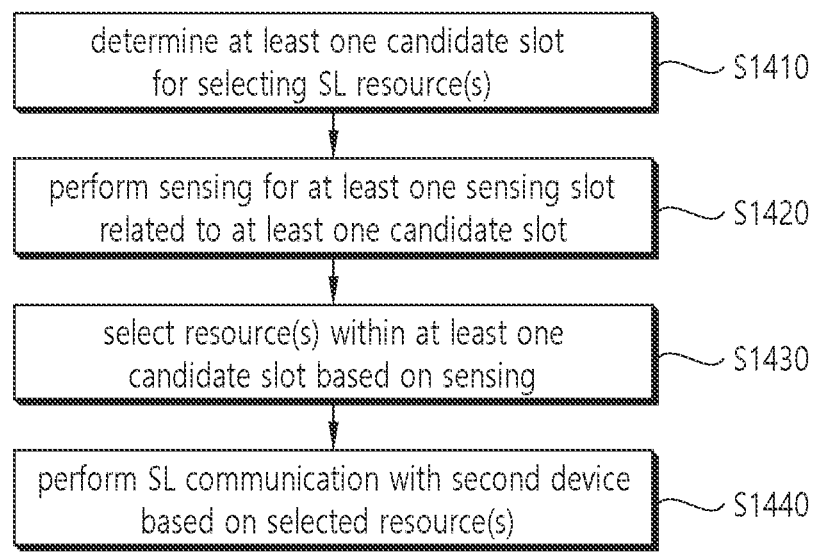
FIG. 14 shows a method for a first device to perform SL communication with a second device based on selected resource(s), based on an embodiment of the present disclosure.

FIG. 14 shows a method for a first device to perform SL communication with a second device based on selected resource(s), based on an embodiment of the present disclosure. The embodiment of FIG. 14 may be combined with various embodiments of the present disclosure.

Referring to FIG. 14, in step S1410, the first device 100 may determine at least one candidate slot for selecting sidelink (SL) resource(s). In step S1420, the first device 100 may perform sensing for at least one sensing slot related to at least one candidate slot. In step S1430, the first device 100 may select resource(s) within at least one candidate slot based on sensing. In step S1440, the first device 100 may perform SL communication with the second device 200 based on the selected resource(s).

For example, the at least one sensing slot may be at least one slot located before resource reservation period(s) configured for a resource pool from the at least one candidate slot.

For example, the at least one sensing slot may be at least one slot located before the maximum resource reservation period configured for the resource pool from the first slot among the at least one candidate slot.

For example, each of the at least one sensing slot may be determined based on at least one of the at least one candidate slot, the resource reservation period(s) configured for the resource pool, or a value for deriving the location of the sensing slot. For example, the value for deriving the location of the sensing slot may be a value indicating in which period the sensing slot is located (i.e., the order of the period in which the sensing slot is located). For example, the value for deriving the location of the sensing slot may be configured in the form of a bitmap. For example, the resource reservation period value(s) may be greater than or equal to a threshold. For example, the threshold may be a pre-configured value.

For example, the at least one sensing slot may be determined for each of the at least one candidate slot.

For example, based on the number of resource reservation periods configured for the resource pool, the at least one sensing slot for the at least one candidate slot may be determined for each of the plurality of resource reservation periods.

For example, the number of the at least one candidate slot may be greater than or equal to a threshold. For example, the number of the at least one candidate slot may be equal to or greater than a pre-configured threshold.

For example, the number of the at least one sensing slot may be determined based on at least one of the size of a window for selecting resource(s), the resource reservation period value(s), the time at which resource selection is triggered, and/or an interval between the time at which resource selection is triggered and the end time of the window.

For example, the first device 100 may receive additional information from the second device 200. For example, the at least one candidate slot may be determined based on the additional information. For example, the additional information may include information on preferred resource(s) or non-preferred resource(s).

For example, an interval between the at least one sensing slot may be greater than or equal to a threshold. For example, the interval between the at least one sensing slot may be greater than or equal to a pre-configured threshold.

The above-described embodiment can be applied to various devices to be described below. For example, the processor 102 of the first device 100 may determine at least one candidate slot for selecting sidelink (SL) resource(s). In addition, for example, the processor 102 of the first device 100 may perform sensing for at least one sensing slot related to at least one candidate slot. In addition, for example, the processor 102 of the first device 100 may select resource(s) within at least one candidate slot based on sensing. In addition, for example, the processor 102 of the first device 100 may control the transceiver 106 to perform SL communication with the second device 200 based on the selected resource(s).

Based on an embodiment of the present disclosure, a first device adapted to perform wireless communication may be provided. For example, the first device may comprise: one or more memories storing instructions; one or more transceivers; and one or more processors connected to the one or more memories and the one or more transceivers. For example, the one or more processors may execute the instructions to: determine at least one candidate slot for selecting a sidelink (SL) resource; perform sensing for at least one sensing slot related to the at least one candidate slot; select a resource within the at least one candidate slot based on the sensing; and perform SL communication with a second device based on the selected resource. For example, the at least one sensing slot may be at least one slot located before a resource reservation period configured for a resource pool from the at least one candidate slot.

Based on an embodiment of the present disclosure, an apparatus adapted to control a first user equipment (UE) may be provided. For example, the apparatus may comprise: one or more processors; and one or more memories operably connected to the one or more processors and storing instructions. For example, the one or more processors may execute the instructions to: determine at least one candidate slot for selecting a sidelink (SL) resource; perform sensing for at least one sensing slot related to the at least one candidate slot; select a resource within the at least one candidate slot based on the sensing; and perform SL communication with a second UE based on the selected resource. For example, the at least one sensing slot may be at least one slot located before a resource reservation period configured for a resource pool from the at least one candidate slot.

Based on an embodiment of the present disclosure, a non-transitory computer-readable storage medium storing instructions may be provided. For example, the instructions, when executed, may cause a first device to: determine at least one candidate slot for selecting a sidelink (SL) resource; perform sensing for at least one sensing slot related to the at least one candidate slot; select a resource within the at least one candidate slot based on the sensing; and perform SL communication with a second device based on the selected resource. For example, the at least one sensing slot may be at least one slot located before a resource reservation period configured for a resource pool from the at least one candidate slot.

Figure 15:
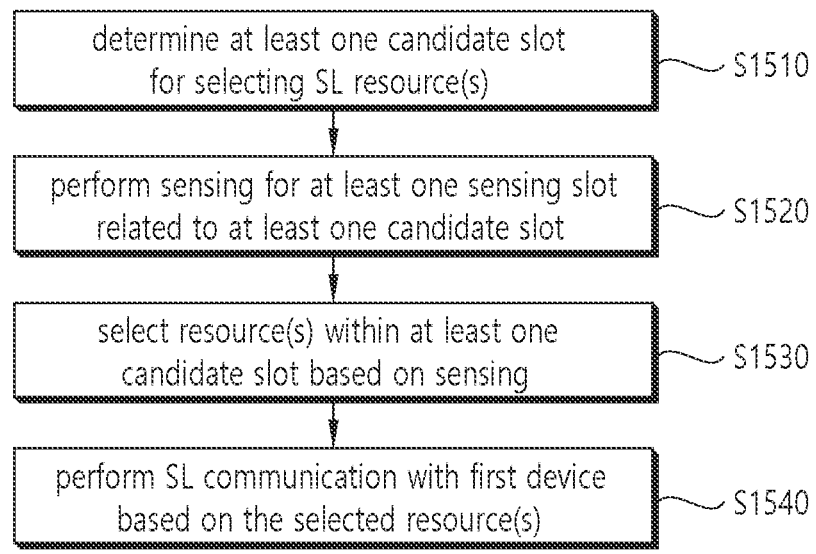
FIG. 15 shows a method for a second device to perform SL communication with a first device based on selected resource(s), based on an embodiment of the present disclosure.

FIG. 15 shows a method for a second device to perform SL communication with a first device based on selected resource(s), based on an embodiment of the present disclosure. The embodiment of FIG. 15 may be combined with various embodiments of the present disclosure.

Referring to FIG. 15, in step S1510, the second device 200 may determine at least one candidate slot for selecting sidelink (SL) resource(s). In step S1520, the second device 200 may perform sensing for at least one sensing slot related to at least one candidate slot. In step S1530, the second device 200 may select resource(s) within at least one candidate slot based on sensing. In step S1540, the second device 200 may perform SL communication with the first device 100 based on the selected resource(s).

For example, the at least one sensing slot may be at least one slot located before resource reservation period(s) configured for a resource pool from the at least one candidate slot.

For example, the second device 200 may transmit additional information to the first device 100. For example, the additional information may include information on preferred resource(s) or non-preferred resource(s).

For example, the at least one sensing slot may be at least one slot located before the maximum resource reservation period configured for the resource pool from the first slot among the at least one candidate slot.

For example, each of the at least one sensing slot may be determined based on at least one of the at least one candidate slot, the resource reservation period(s) configured for the resource pool, or a value for deriving the location of the sensing slot. For example, the value for deriving the location of the sensing slot may be a value indicating in which period the sensing slot is located (i.e., the order of the period in which the sensing slot is located). For example, the value for deriving the location of the sensing slot may be configured in the form of a bitmap. For example, the resource reservation period value(s) may be greater than or equal to a threshold. For example, the threshold may be a pre-configured value.

For example, the at least one sensing slot may be determined for each of the at least one candidate slot.

For example, based on the number of resource reservation periods configured for the resource pool, the at least one sensing slot for the at least one candidate slot may be determined for each of the plurality of resource reservation periods.

For example, the number of the at least one candidate slot may be greater than or equal to a threshold. For example, the number of the at least one candidate slot may be equal to or greater than a threshold pre-configured for a UE.

For example, the number of the at least one sensing slot may be determined based on at least one of the size of a window for selecting resource(s), the resource reservation period value(s), the time at which resource selection is triggered, and/or an interval between the time at which resource selection is triggered and the end time of the window.

For example, an interval between the at least one sensing slot may be greater than or equal to a threshold. For example, the interval between the at least one sensing slot may be greater than or equal to a pre-configured threshold.

The above-described embodiment can be applied to various devices to be described below. For example, the processor 202 of the second device 200 may determine at least one candidate slot for selecting sidelink (SL) resource(s). In addition, for example, the processor 202 of the second device 200 may perform sensing for at least one sensing slot related to the at least one candidate slot. In addition, for example, the processor 202 of the second device 200 may select resource(s) within the at least one candidate slot based on sensing. In addition, for example, the processor 202 of the second device 200 may control the transceiver 206 to perform SL communication with the first device 100 based on the selected resource(s).

Based on an embodiment of the present disclosure, a second device adapted to perform wireless communication may be provided. For example, the second device may comprise: one or more memories storing instructions; one or more transceivers; and one or more processors connected to the one or more memories and the one or more transceivers. For example, the one or more processors may execute the instructions to: determine at least one candidate slot for selecting a sidelink (SL) resource; perform sensing for at least one sensing slot related to the at least one candidate slot; select a resource within the at least one candidate slot based on the sensing; and perform SL communication with a first device based on the selected resource. For example, the at least one sensing slot may be at least one slot located before a resource reservation period configured for a resource pool from the at least one candidate slot.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
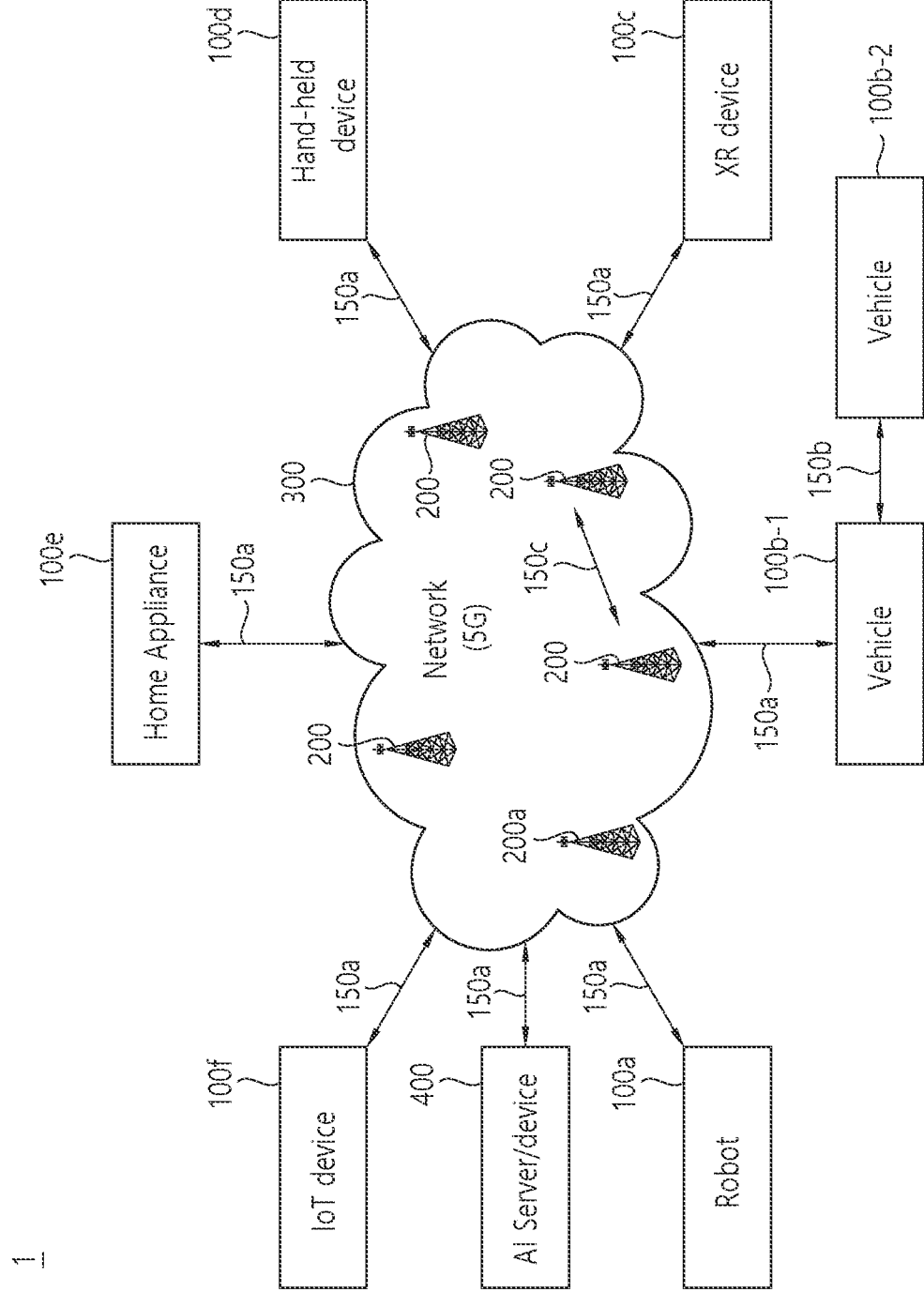
FIG. 16 shows a communication system 1, based on an embodiment of the present disclosure.

FIG. 16 shows a communication system 1, based on an embodiment of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M. and is not limited to the name described above. Additionally or alternatively, the wireless communication technology implemented in the wireless devices 100a to 100f of the present disclosure may include at least one of Bluetooth. Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
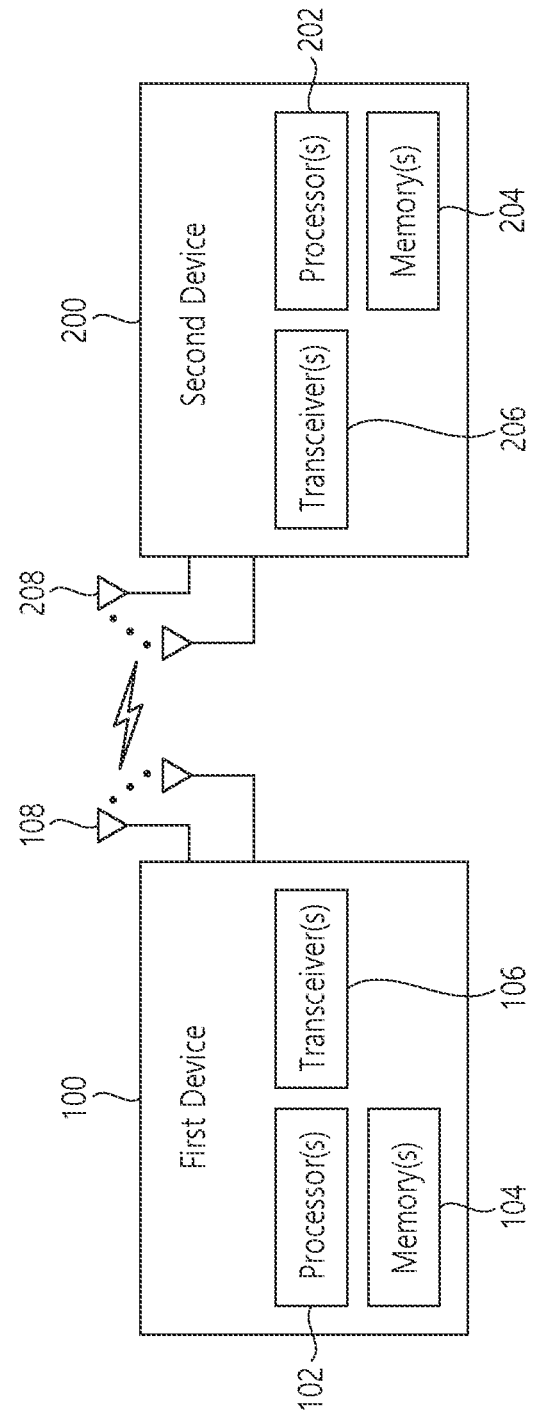
FIG. 17 shows wireless devices, based on an embodiment of the present disclosure.

FIG. 17 shows wireless devices, based on an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
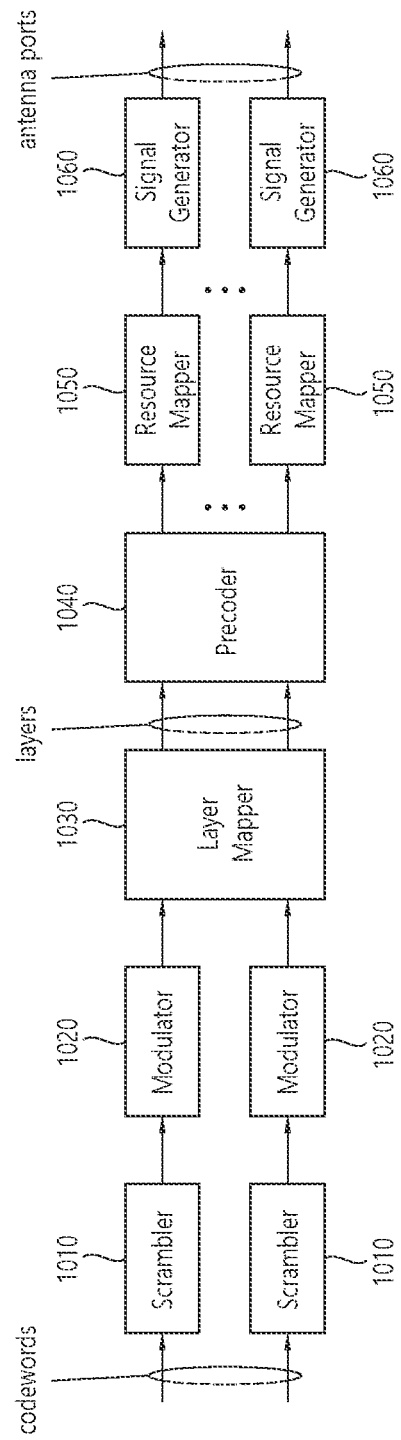
FIG. 18 shows a signal process circuit for a transmission signal, based on an embodiment of the present disclosure.

FIG. 18 shows a signal process circuit for a transmission signal, based on an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
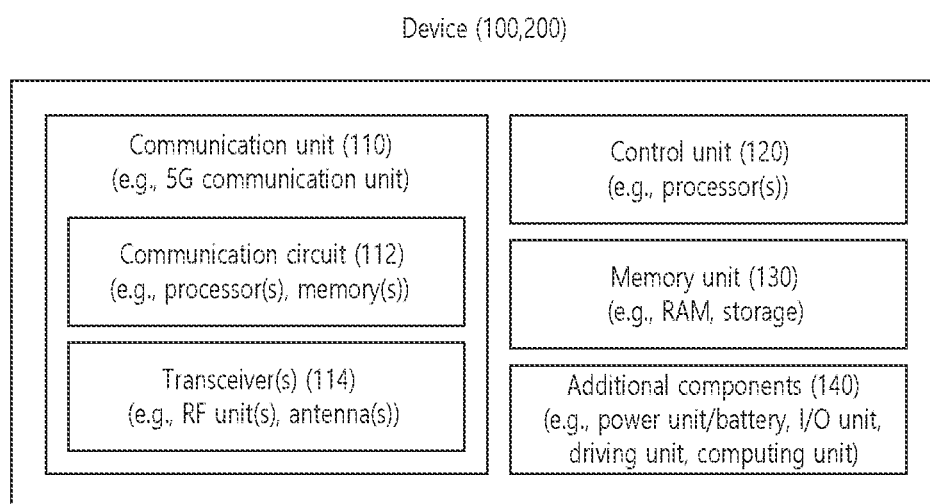
FIG. 19 shows another example of a wireless device, based on an embodiment of the present disclosure.

FIG. 19 shows another example of a wireless device, based on an embodiment of the present disclosure. The wireless device may be implemented in various forms according to a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
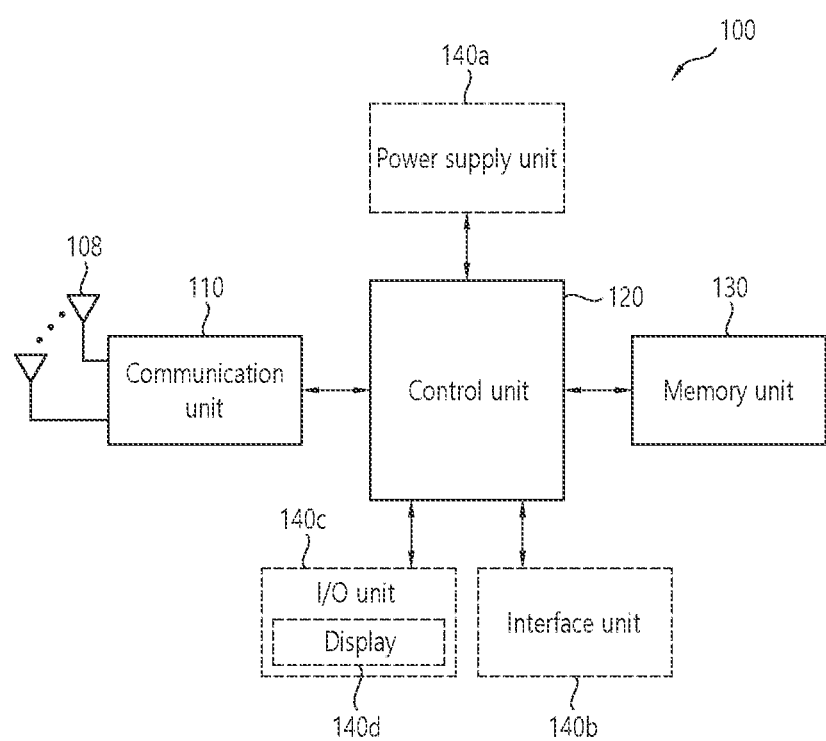
FIG. 20 shows a hand-held device, based on an embodiment of the present disclosure.

FIG. 20 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 21:
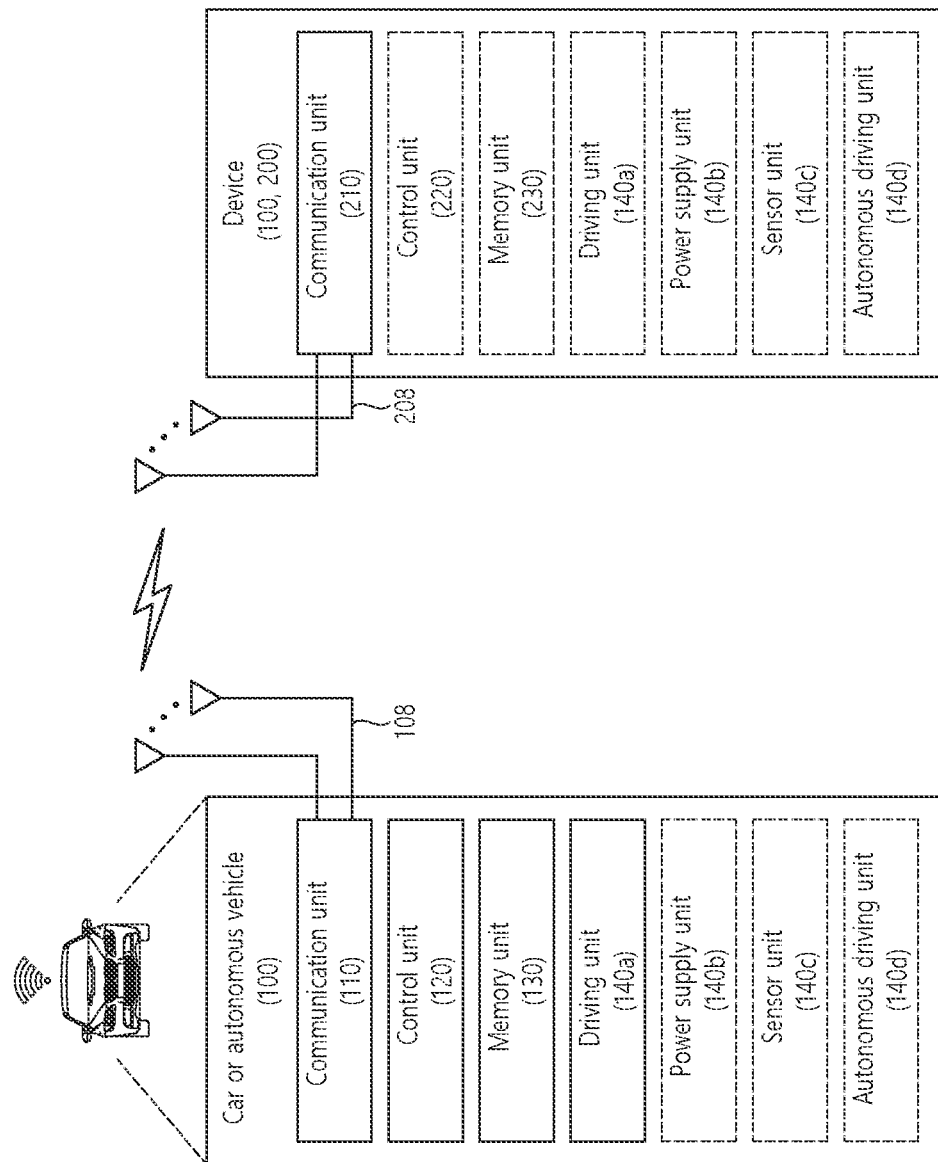
FIG. 21 shows a vehicle or an autonomous vehicle, based on an embodiment of the present disclosure.

FIG. 21 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 21, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
   obtaining information regarding a resource reservation period and sensing occasion information representing that the first device additionally monitors periodic sensing occasions;
   determining a time interval based on a remaining packet delay budget;
   monitoring slots related to Y candidate slots within the time interval; and
   selecting a resource within the Y candidate slots,
   wherein, based on that the sensing occasion information is configured for the first device, the slots monitored by the first device include a most recent sensing occasion before the Y candidate slots for the resource reservation period and a last periodic sensing occasion prior to the most recent sensing occasion for the resource reservation period, and
   wherein the Y is a positive integer.

2. The method of claim 1, wherein the information regarding the resource reservation period and the sensing occasion information are configured for a resource pool.

3. The method of claim 1, wherein the most recent sensing occasion is located before the resource reservation period from each of the Y candidate slots, and
   wherein the last periodic sensing occasion is located before the resource reservation period from the most recent sensing occasion.

4. The method of claim 1, wherein the slots monitored by the first device are not earlier than a start of a sensing window, and
   wherein a slot which is earlier than the start of the sensing window excludes from the slots monitored by the first device.

5. The method of claim 1, wherein the resource reservation period is a unit of a logical slot.

6. The method of claim 5, wherein the logical slot is a slot belonging to a resource pool.

7. The method of claim 1, wherein the slots monitored by the first device includes 31 slots before the Y candidate slots.

8. The method of claim 7, wherein the 31 slots are 31 consecutive logical slots.

9. The method of claim 1, wherein the slots monitored by the first device includes M slots before the Y candidate slots,
   wherein the M is configured for a resource pool, and
   wherein the M is a positive integer.

10. The method of claim 9, wherein the M slots are M consecutive logical slots.

11. The method of claim 1, further comprising:
    triggering, in a slot, resource selection for sidelink transmission,
    wherein the time interval is determined based on the remaining packet delay budget and the slot.

12. The method of claim 1, further comprising:
    selecting the Y candidate slots within the time interval.

13. A first device configured to perform wireless communication, the first device comprising: at least one transceiver; at least one processor; and at least one memory connected to the at least one processor and storing instructions that, based on being executed by the at least one processor, cause the first device to perform operations comprising: obtaining information regarding a resource reservation period and sensing occasion information representing that the first device additionally monitors periodic sensing occasions; determining a time interval based on a remaining packet delay budget; monitoring slots related to Y candidate slots within the time interval; and selecting a resource within the Y candidate slots, wherein, based on that the sensing occasion information is configured for the first device, the slots monitored by the first device include a most recent sensing occasion before the Y candidate slots for the resource reservation period and a last periodic sensing occasion prior to the most recent sensing occasion for the resource reservation period, and wherein the Y is a positive integer.

14. The first device of claim 13, wherein the information regarding the resource reservation period and the sensing occasion information are configured for a resource pool.

15. The first device of claim 13, wherein the most recent sensing occasion is located before the resource reservation period from each of the Y candidate slots, and
    wherein the last periodic sensing occasion is located before the resource reservation period from the most recent sensing occasion.

16. The first device of claim 13, wherein the slots monitored by the first device are not earlier than a start of a sensing window, and
    wherein a slot which is earlier than the start of the sensing window excludes from the slots monitored by the first device.

17. A processing device configured to control a first device, the processing device comprising: at least one processor; and at least one memory connected to the at least one processor and storing instructions that, based on being executed by the at least one processor, cause the first device to perform operations comprising: obtaining information regarding a resource reservation period and sensing occasion information representing that the first device additionally monitors periodic sensing occasions; determining a time interval based on a remaining packet delay budget; monitoring slots related to Y candidate slots within the time interval; and selecting a resource within the Y candidate slots, wherein, based on that the sensing occasion information is configured for the first device, the slots monitored by the first device include a most recent sensing occasion before the Y candidate slots for the resource reservation period and a last periodic sensing occasion prior to the most recent sensing occasion for the resource reservation period, and wherein the Y is a positive integer.

18. The processing device of claim 17, wherein the information regarding the resource reservation period and the sensing occasion information are configured for a resource pool.

19. The processing device of claim 17, wherein the most recent sensing occasion is located before the resource reservation period from each of the Y candidate slots, and
   wherein the last periodic sensing occasion is located before the resource reservation period from the most recent sensing occasion.

20. The processing device of claim 17, wherein the slots monitored by the first device are not earlier than a start of a sensing window, and
   wherein a slot which is earlier than the start of the sensing window excludes from the slots monitored by the first device.

* * * * *